United States Patent
Yumiki

(10) Patent No.: US 8,400,554 B2
(45) Date of Patent: *Mar. 19, 2013

(54) LENS BARREL AND IMAGING DEVICE

(75) Inventor: Naoto Yumiki, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/426,853

(22) Filed: Mar. 22, 2012

(65) Prior Publication Data

US 2012/0176531 A1    Jul. 12, 2012

Related U.S. Application Data

(63) Continuation of application No. 12/547,598, filed on Aug. 26, 2009.

(30) Foreign Application Priority Data

Sep. 10, 2008  (JP) .................................. 2008-232041

(51) Int. Cl.
G03B 13/00 (2006.01)
(52) U.S. Cl. ......... 348/340; 348/345; 348/360; 348/375
(58) Field of Classification Search .................. None
See application file for complete search history.

(56) References Cited

U.S. PATENT DOCUMENTS

| | | | |
|---|---|---|---|
| 4,596,454 A | 6/1986 | Kawai et al. | |
| 4,682,871 A | 7/1987 | Metabi | |
| 4,999,656 A | 3/1991 | Shimizu et al. | |
| 5,223,980 A * | 6/1993 | Hamasaki | 359/694 |
| 5,231,473 A | 7/1993 | Kawamura et al. | |
| 5,264,966 A | 11/1993 | Okada et al. | |
| 5,572,374 A | 11/1996 | Okada et al. | |
| 5,969,886 A * | 10/1999 | Sato et al. | 359/813 |
| 6,128,141 A | 10/2000 | Sato et al. | |
| 2005/0168836 A1 | 8/2005 | Koyama et al. | |
| 2005/0286141 A1 | 12/2005 | Ichinose et al. | |
| 2006/0083505 A1 | 4/2006 | Kashiwaba | |

FOREIGN PATENT DOCUMENTS

| | | |
|---|---|---|
| JP | 2-170002 | 6/1990 |
| JP | 4-217214 A | 8/1992 |
| JP | 6-18756 | 1/1994 |
| JP | 6-174997 A | 6/1994 |
| JP | 8-266093 A | 10/1996 |
| JP | 10096847 A * | 4/1998 |
| JP | 2001-116972 | 4/2001 |
| JP | 2002-258130 A | 9/2002 |
| JP | 2004-077925 | 3/2004 |
| JP | 2004-77925 A | 3/2004 |
| JP | 2005-55664 | 3/2005 |
| JP | 2005-62342 | 3/2005 |
| JP | 2005-215565 A | 8/2005 |
| JP | 2006-10991 A | 1/2006 |
| JP | 2006-113289 A | 4/2006 |

* cited by examiner

*Primary Examiner* — Chieh M Fan
*Assistant Examiner* — Angel L Garces-Rivera
(74) *Attorney, Agent, or Firm* — Panasonic Patent Center

(57) ABSTRACT

A lens barrel is a lens barrel that can be mounted to a camera body, including a lens element, a lens support frame, an actuator, and an electrical contact. The lens support frame supports the lens element. The actuator is arranged to drive the lens support frame in an optical direction of the lens element, and includes a drive shaft and a detector configured to detect rotation of the drive shaft. The electrical contact is disposed on the opposite side from the actuator with respect to the lens element when viewed in the optical axis direction parallel to the optical axis of the lens element, and is configured to be electrically connected with the camera body.

6 Claims, 14 Drawing Sheets

LENS BARREL AND IMAGING DEVICE

CROSS-REFERENCE TO RELATED APPLICATIONS

This application claims priority to Japanese Patent Application No. 2008-232041 filed on Sep. 10, 2008. The entire disclosure of Japanese Patent Application No. 2008-232041 is hereby incorporated herein by reference.

BACKGROUND

1. Technical Field

The technical field relates to a lens barrel with which the focal distance can be changed.

2. Description of the Related Art

Digital single lens cameras with which an optical image of a subject can be converted into an electrical image signal and outputted have rapidly grown in popularity in recent years. These digital single lens cameras generally have an interchangeable lens configuration, with which lenses can be attached and removed.

With this type of interchangeable lens unit, a stepping motor equipped with an encoder is sometimes employed as the actuator that drives the lens group (see, for example, Japanese Laid-Open Patent Application H08-266093). With this actuator, the direction of rotation of the stepping motor, its speed, angle information, and electrical phase angle information can be accurately detected on the basis of the output from the encoder. When drive is controlled on the basis of the electrical phase angle, this raises the resolution of the rotational angle position, and also greatly increases the rotational speed.

A lens mount that is mounted to a camera body is provided to the interchangeable lens unit. A lens mount contact and an electrical substrate are provided around the lens mount. The lens mount contact is electrically connected to a body mount contact of the camera body. The electrical substrate is connected to the lens mount contact. Electronic parts are mounted on the electrical substrate. Information can be sent back and forth between the interchangeable lens unit and the camera body via the lens mount contact and the body mount contact.

Thus, contacts, the electrical substrate, and electronic parts are packed closely together around the lens mount.

However, if the above-mentioned actuator is disposed around the lens mount, there is the danger that noise generated from the contacts, the electrical substrate, etc., will affect the encoder detection result. Japanese Laid-Open Patent Application 2004-77925 discloses a configuration around a lens mount, but discloses nothing at all about the layout of the actuator that would take the effect of noise into account.

SUMMARY

A lens barrel according to a first aspect is a lens barrel that can be mounted to a camera body, comprising a lens element, a lens support frame, an actuator, and an electrical contact. The lens support frame supports the lens element. The actuator is fixed to the lens support frame, and includes a drive shaft and a detector configured to detect rotation of the drive shaft. The electrical contact is disposed on the opposite side from the actuator with respect to the lens element when viewed in the optical axis direction parallel to the optical axis of the lens element, and is configured to be electrically connected with the camera body.

With this lens barrel, when viewed in the optical axis direction, the electrical contact is disposed on the opposite side from the actuator with respect to the lens element, so the actuator can be disposed at a position that is away from the electrical contact. Consequently, the detector of the actuator is less apt to be affected by noise generated at the electrical contact, so there is less decrease in detection accuracy by the detector.

A lens barrel according to a second aspect is a lens barrel that can be mounted to a camera body, comprising a lens element, a lens support frame that supports the lens element, an actuator, and an electrical substrate. The actuator is fixed to the lens support frame. The electrical substrate is disposed on the outer peripheral side of the lens element so as to surround the lens element, and is cut out at a portion corresponding to the actuator when viewed in the optical axis direction parallel to the optical axis of the lens element.

The lens barrel here encompasses not only a type that is integrated with a camera body, but also an interchangeable lens unit used in an interchangeable lens type of imaging device. Imaging devices include those in which a camera body and a lens barrel are integrated, as well as interchangeable lens imaging devices. Examples of imaging devices include digital still cameras, interchangeable lens digital cameras, digital video cameras, portable telephones with a camera function, and PDAs (Personal Digital Assistants) with a camera function. The imaging device encompasses devices capable of capturing only still pictures, devices capable of capturing only moving pictures, and devices capable of capturing still pictures and moving pictures.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Summary of Digital Camera

Figure 1:
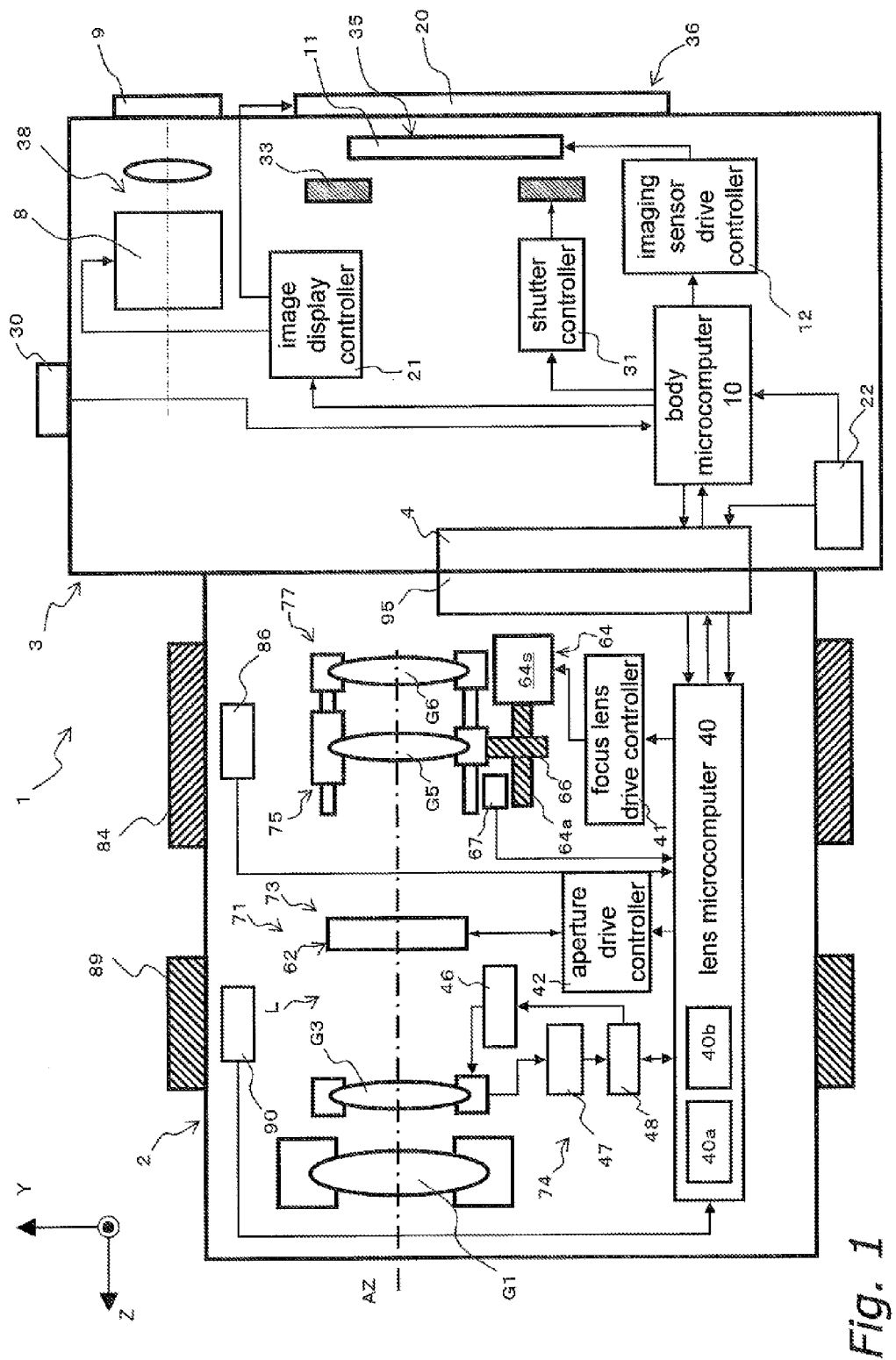
FIG. 1 is a simplified diagram of a digital camera.

A digital camera 1 will be described through reference to FIGS. 1 to 12. FIG. 1 is a simplified diagram of the digital camera 1. As shown in FIG. 1, the digital camera 1 (an example of the imaging device) is a digital camera with an interchangeable lens, and mainly comprises a camera body 3 and an interchangeable lens unit 2 (an example of the lens barrel) that is removably mounted to the camera body 3. The interchangeable lens unit 2 is mounted via a lens mount 95 to a body mount 4 provided to the front face of the camera body 3.

Figure 2:
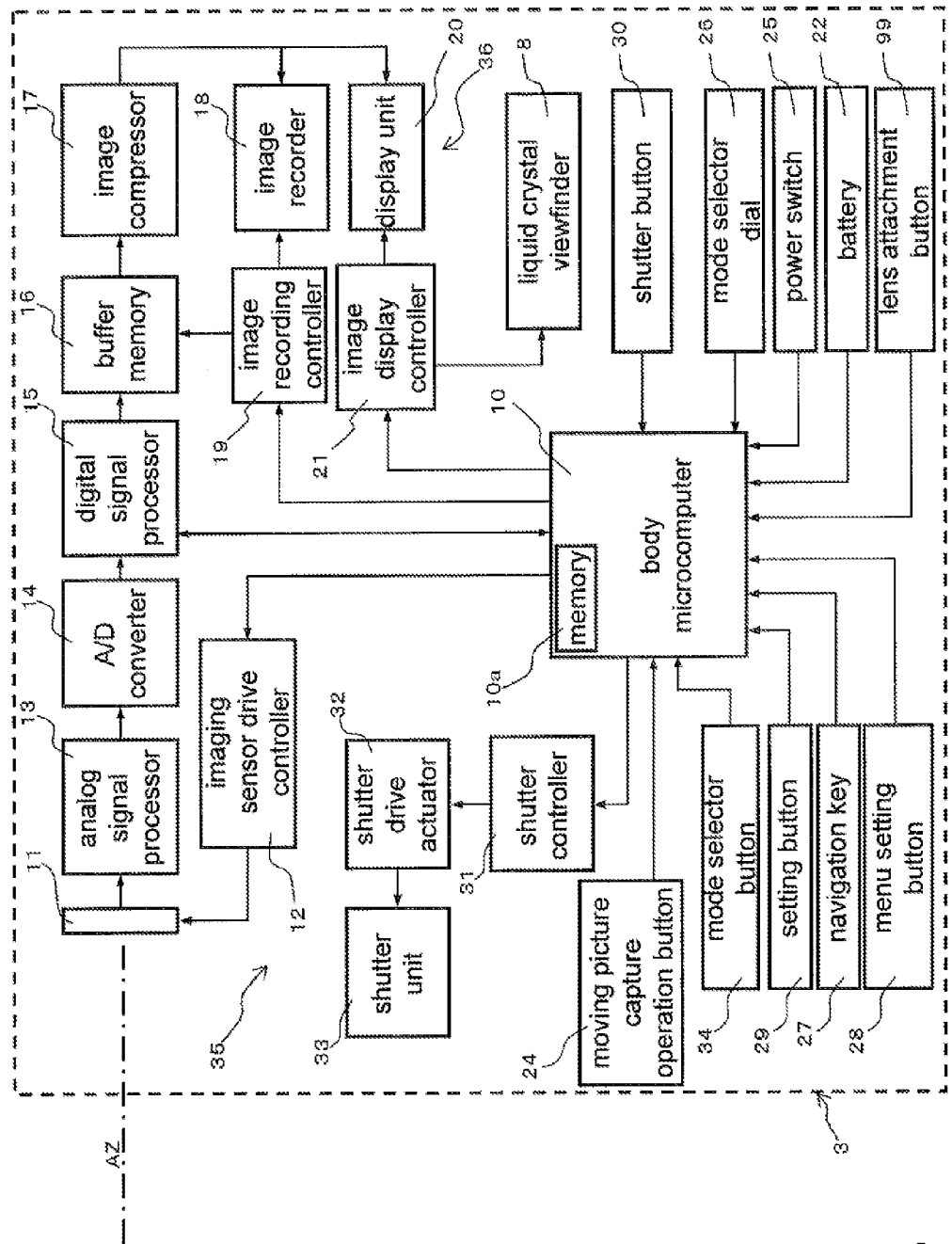
FIG. 2 is a block diagram of the configuration of a camera body.
Figure 3:
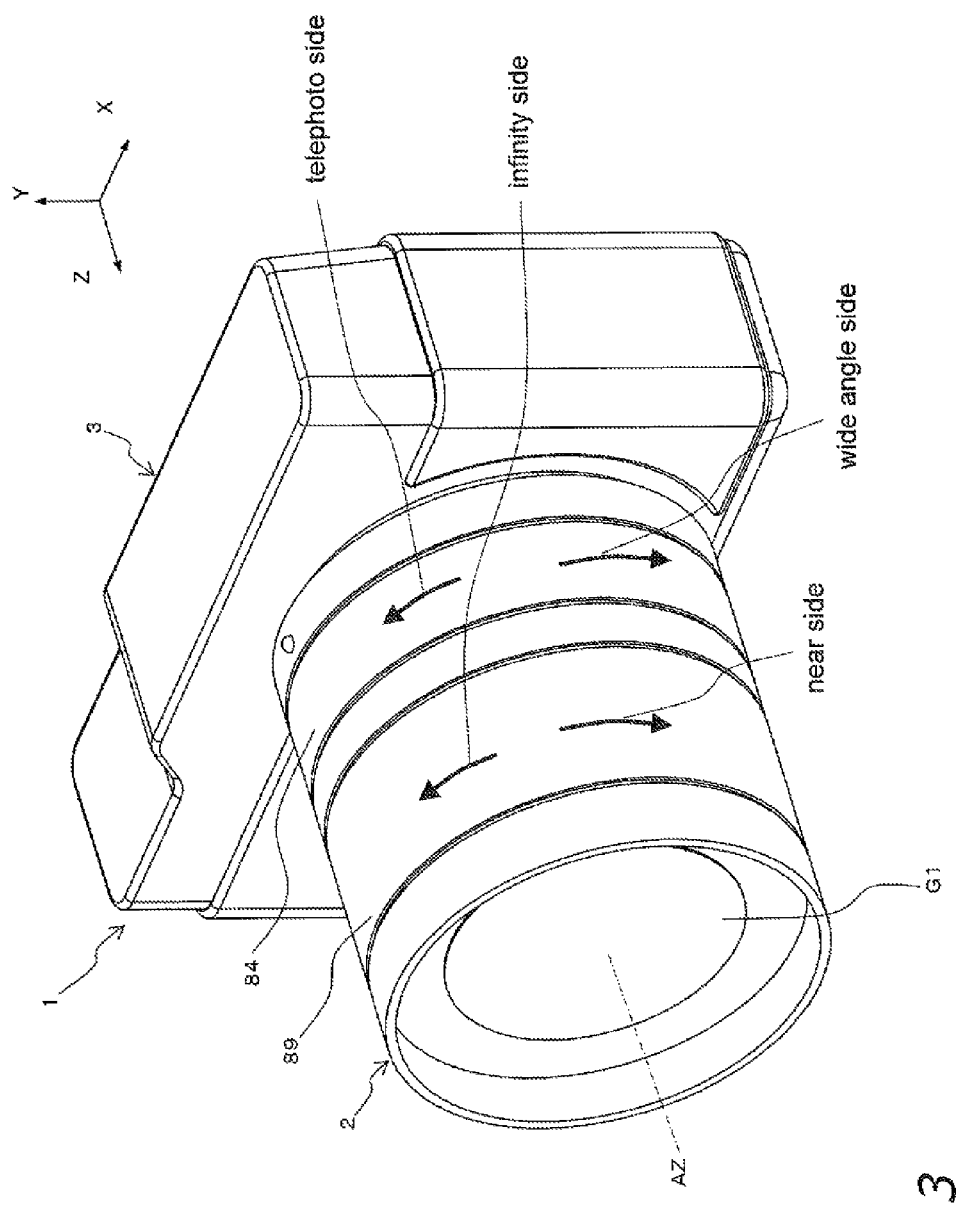
FIG. 3 is a simplified oblique view of a digital camera.
Figure 4A:
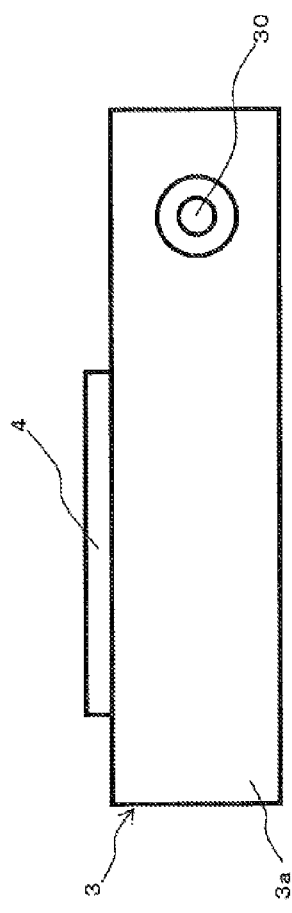
FIG. 4A is a top view of a camera body.
Figure 4B:
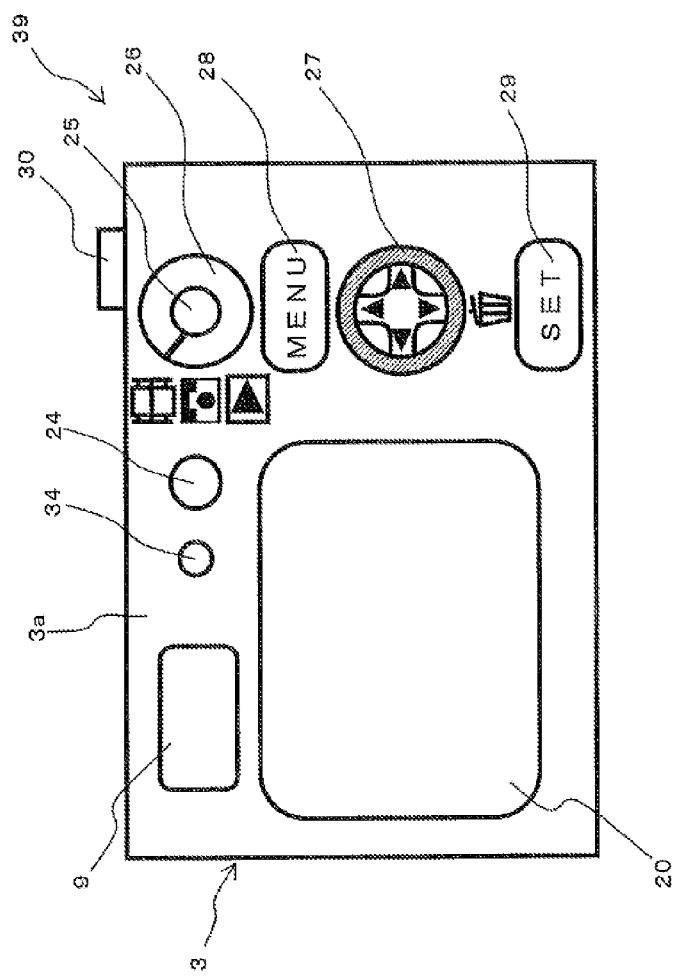
FIG. 4B is a rear view of a camera body.
Figure 5:
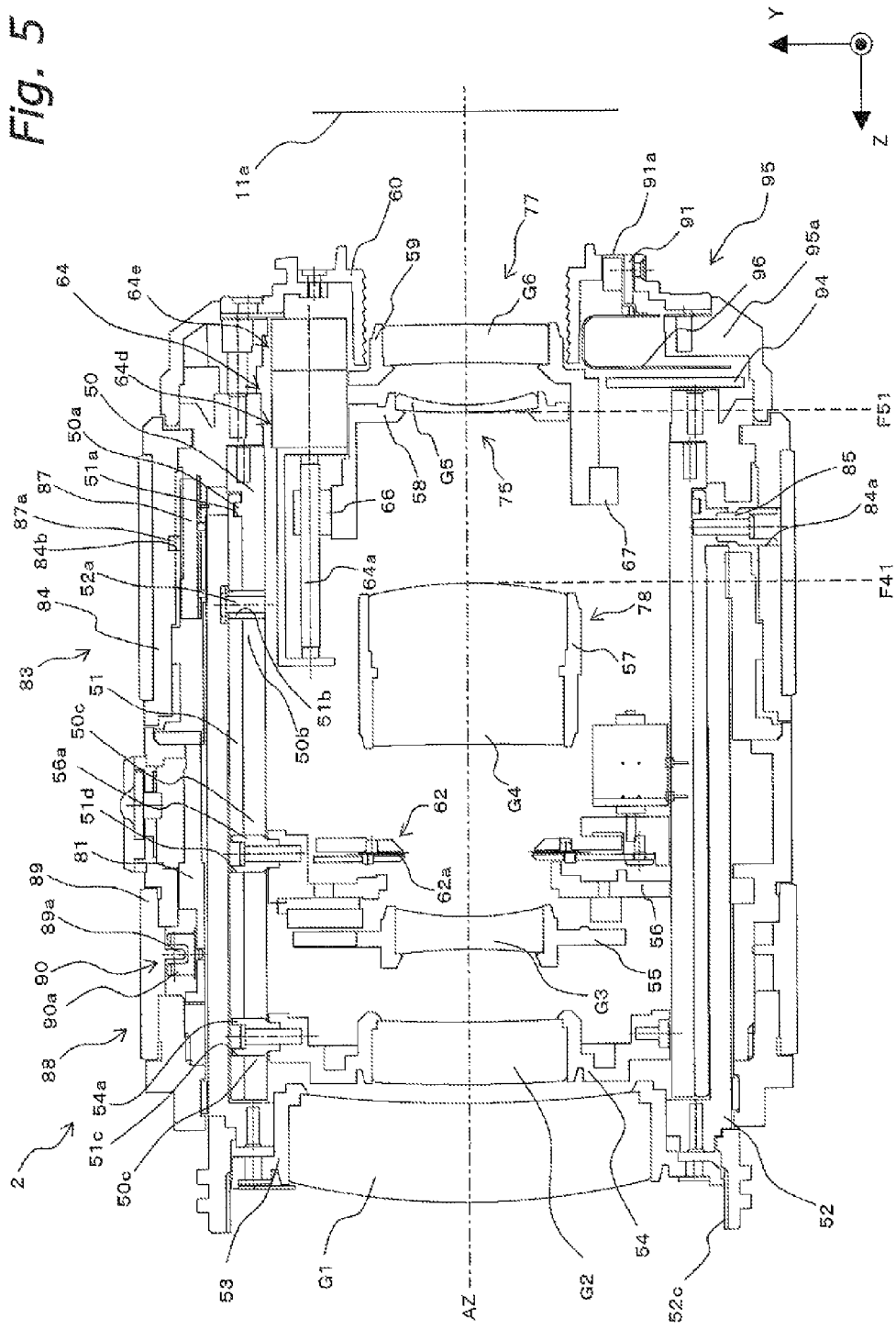
FIG. 5 is a cross section of an interchangeable lens unit (wide angle end)
Figure 6:
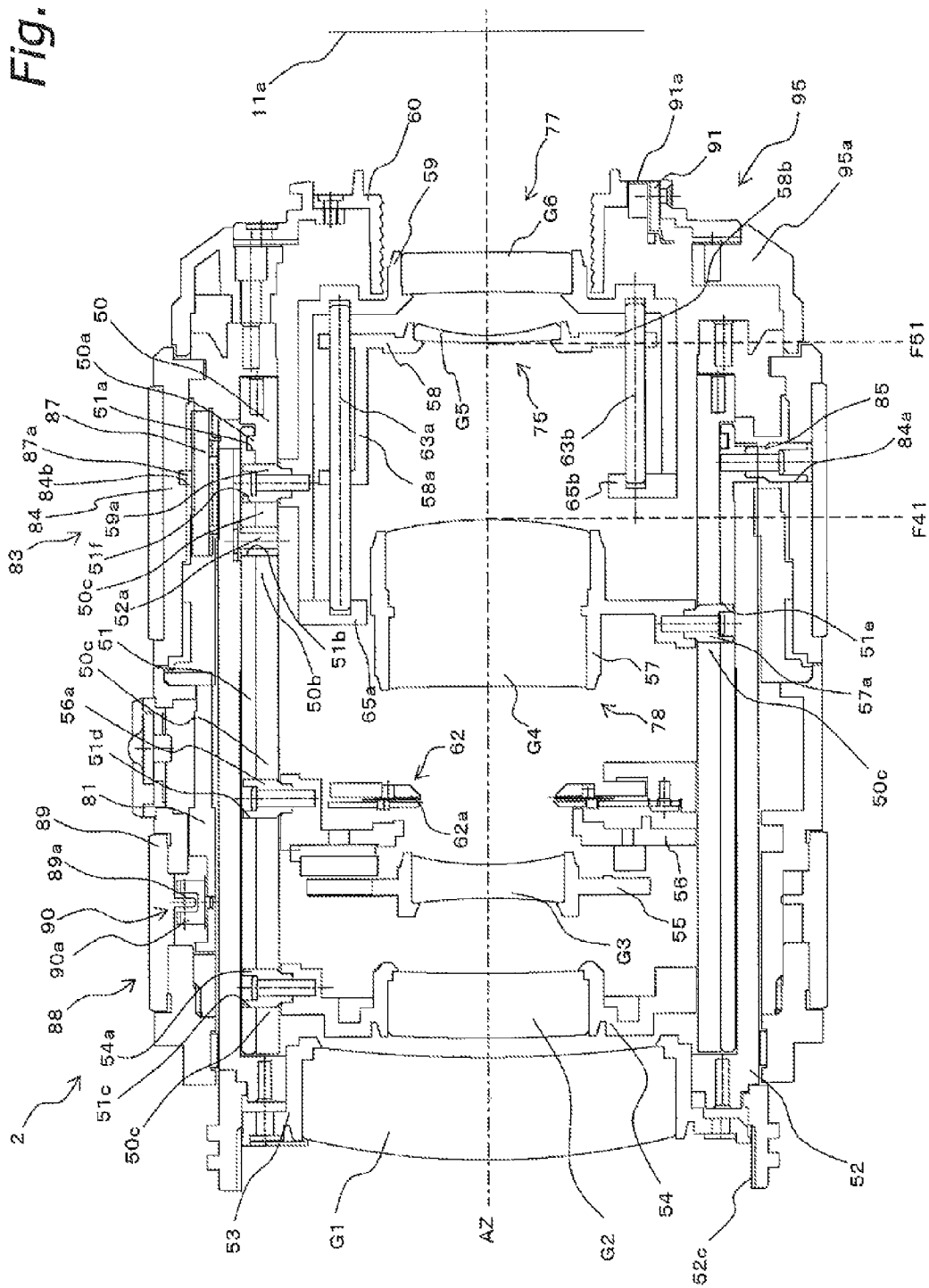
FIG. 6 is a cross section of an interchangeable lens unit (wide angle end)
Figure 7:
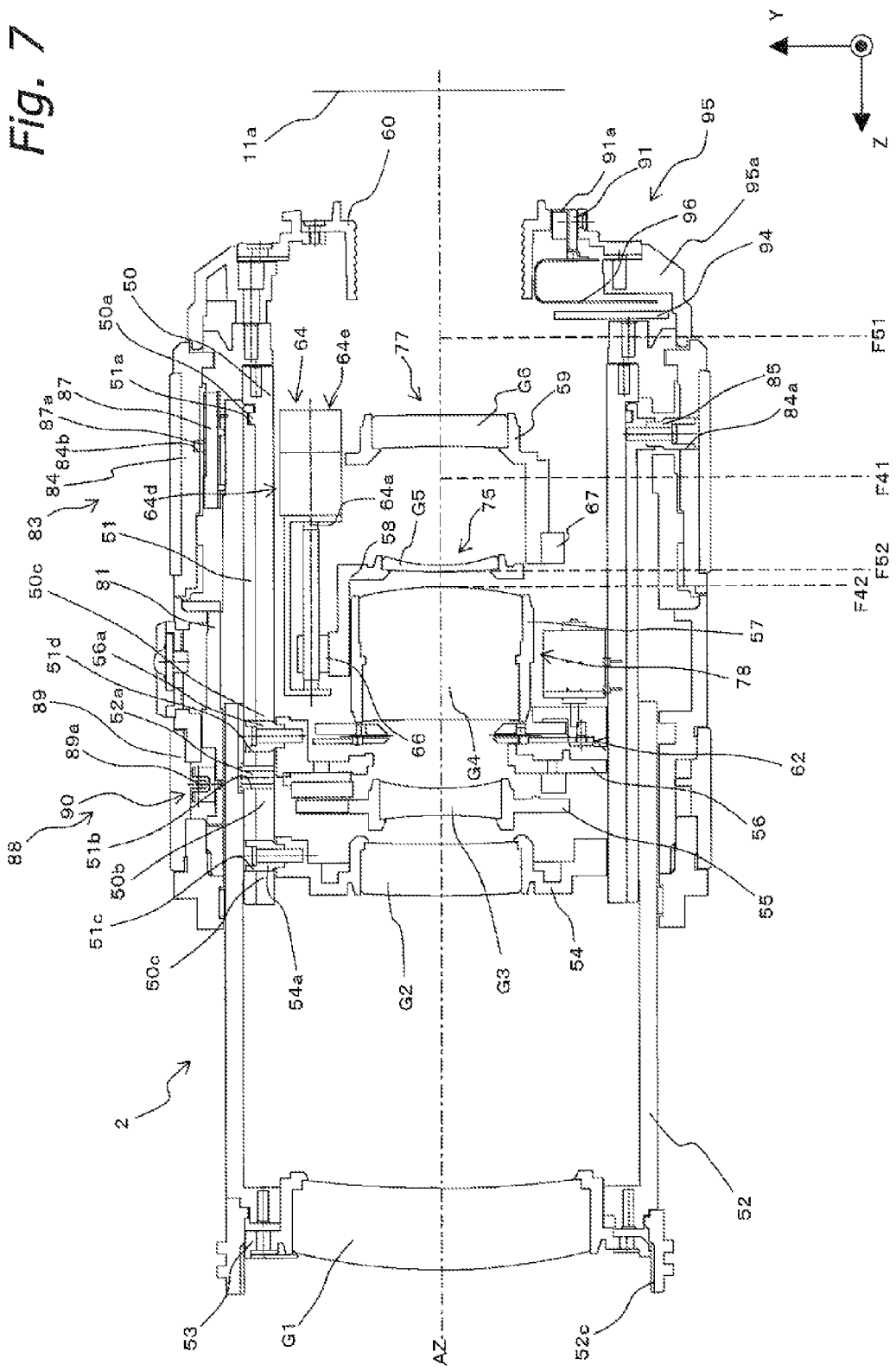
FIG. 7 is a cross section of an interchangeable lens unit (telephoto end)
Figure 8:
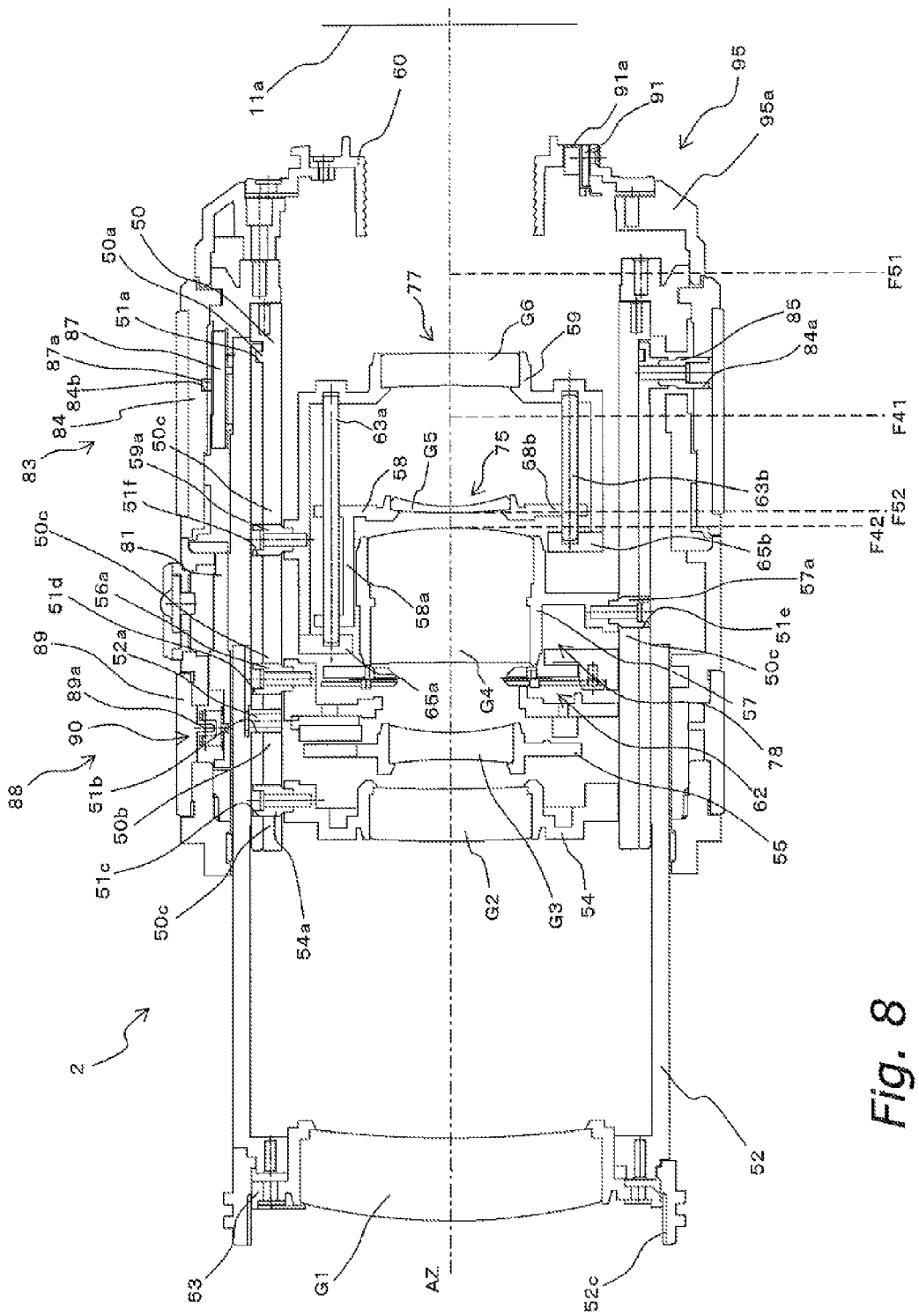
FIG. 8 is a cross section of an interchangeable lens unit (telephoto end)
Figure 9:
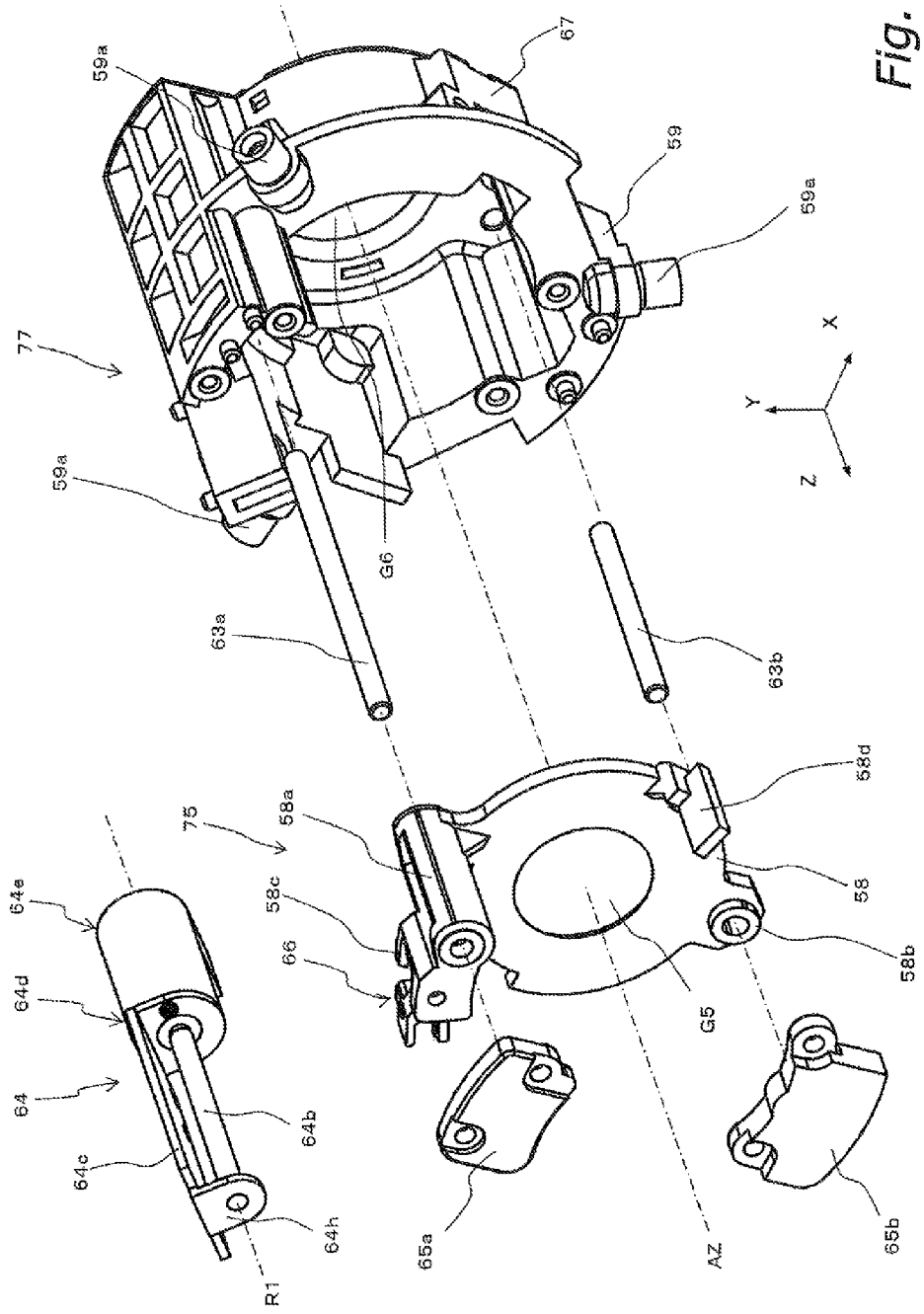
FIG. 9 is an exploded oblique view of a second lens group unit and a focus lens unit.
Figure 10:
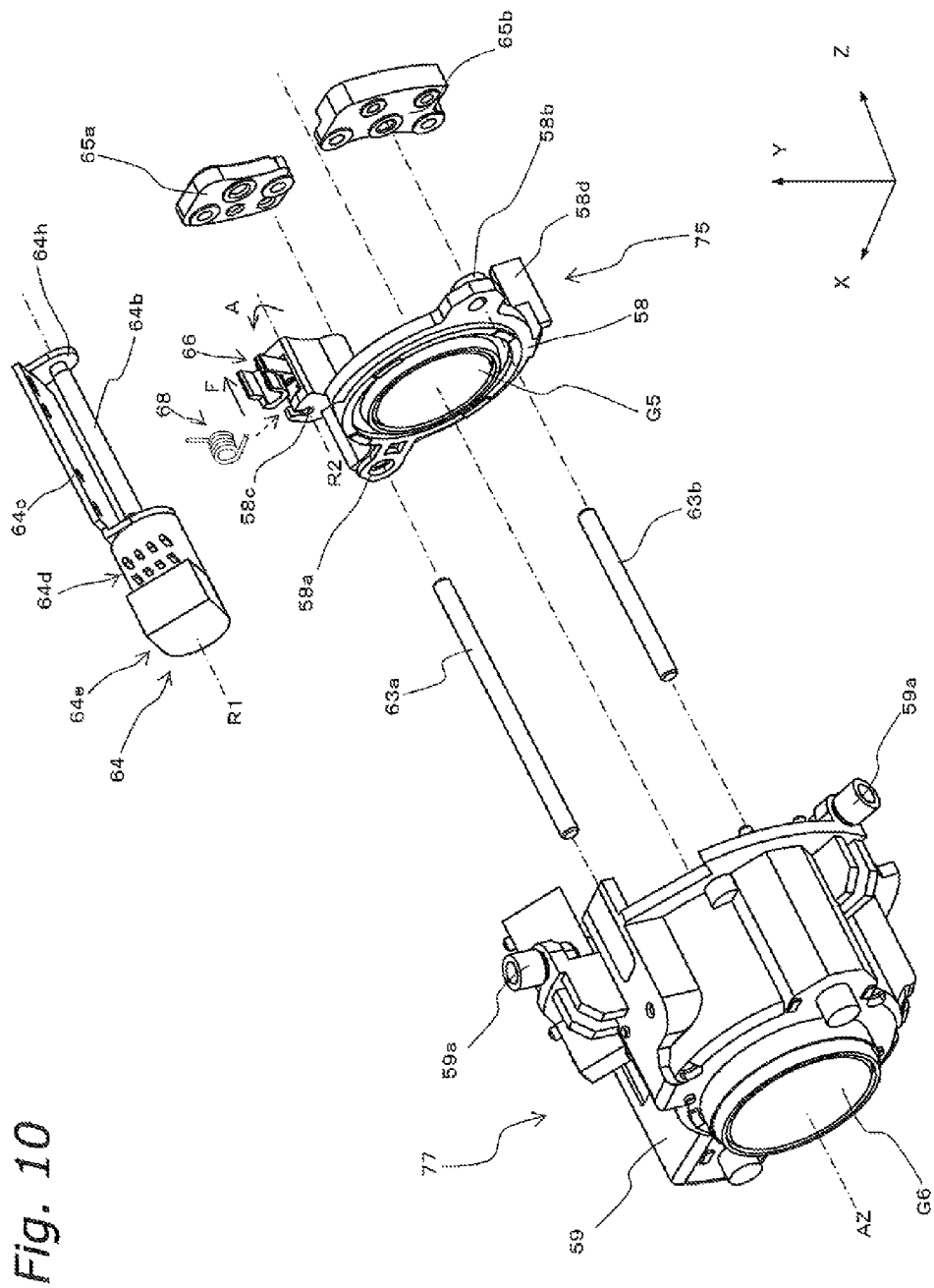
FIG. 10 is an exploded oblique view of a second lens group unit and a focus lens unit.
Figure 11:
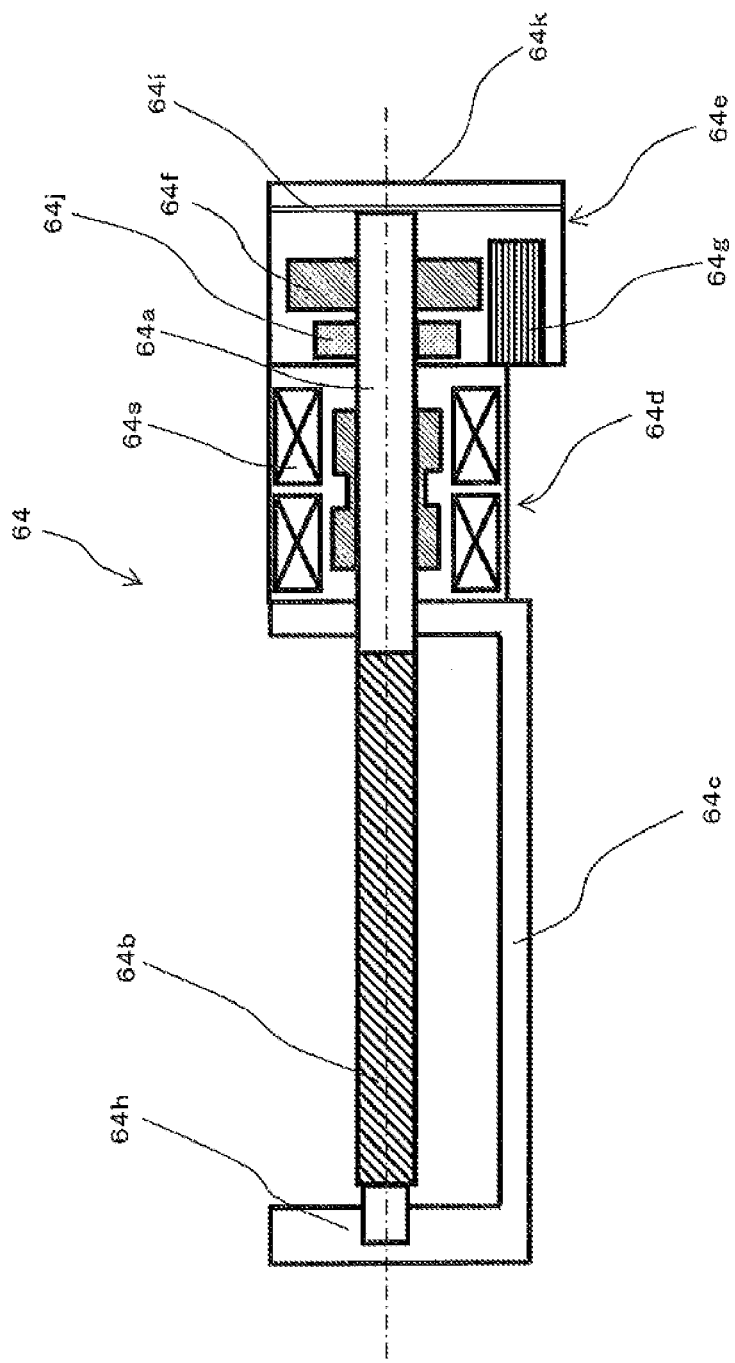
FIG. 11 is a simplified cross section of a focus motor.

FIG. 2 is a block diagram of the configuration of the camera body 3. FIG. 3 is a simplified oblique view of the digital camera 1. FIG. 4A is a top view of the camera body 3, and FIG. 4B is a rear view of the camera body 3. FIGS. 5 to 8 are simplified cross sections of the interchangeable lens unit 2. FIGS. 5 and 6 show the state at the wide angle end, while FIGS. 7 and 8 show the state at the telephoto end. FIG. 6 is a cross section in a different plane from that of FIG. 5. FIG. 8 is a cross section in a different plane from that of FIG. 7. FIGS. 9 and 10 are exploded oblique views of a sixth lens group unit 77 and a focus lens unit 75. FIG. 11 is a simplified cross section of a focus motor 64.

In this embodiment, a three-dimensionally perpendicular coordinate system is set with respect to the digital camera 1. The optical axis AZ (an example of the optical axis center line) of the optical system L (discussed below) coincides with the Z axis direction (an example of the optical axis direction). The X axis direction coincides with the horizontal direction when the digital camera 1 is in its portrait orientation, and the Y axis direction coincides with the vertical direction when the digital camera 1 is in its landscape orientation. In the following description, "front" means on the subject side of the digital camera 1 (the Z axis positive direction side), and "rear" means the opposite side from the subject side of the digital camera 1 (the user side, or the Z axis direction negative side).

Interchangeable Lens Unit

As shown in FIG. 1, the interchangeable lens unit 2 has the optical system L, a lens support mechanism 71 that supports the optical system L, a focus adjusting unit 72, an aperture adjusting unit 73, a blur correction unit 74, and a lens microcomputer 40 (an example of the drive controller).

(1) Optical System

The optical system L is a zoom lens system for forming an optical image of a subject, and is mainly made up of four lens groups. More specifically, as shown in FIGS. 5 to 8, the optical system L has a first lens group G1 having a positive refractive power, a second lens group G2 having a negative refractive power, a third lens group G3 having a negative refractive power, a fourth lens group G4 having a positive refractive power (an example of the first lens element), a fifth lens group G5 having a negative refractive power (an example of the focus lens), and a sixth lens group G6 having a positive refractive power (an example of the second lens element, and an example of a lens element). The first to sixth lens groups G1 to G6 are each constituted by a single lens.

When zooming in from the wide angle end to the telephoto end, the first to sixth lens groups G1 to G6 each move in the Z axis direction along the optical axis AZ toward the subject side. An aperture unit 62 is disposed between the third lens group G3 and the fourth lens group G4, and moves in the Z axis direction integrally with the third lens group G3.

When focusing from an infinity focal state to a close focal state, the fifth lens group G5 moves along the optical axis AZ to the subject side.

Furthermore, the third lens group G3 moves in two directions perpendicular to the optical axis AZ in order to suppress blurring in the optical image attributable to movement of the digital camera 1.

(2) Lens Support Mechanism

The lens support mechanism 71 is for movably supporting the optical system L, and has the lens mount 95, a fixed frame 50, a cam barrel 51, a first holder 52, a first lens group support frame 53, a second lens group support frame 54, a third lens group support frame 56, a fourth lens group support frame 57 (an example of the first lens support frame), a fifth lens group support frame 58 (an example of the focus lens support frame), a sixth lens group support frame 59 (an example of the second lens support frame, and an example of a lens support frame), a zoom ring unit 83 (an example of the zoom mechanism), and a focus ring unit 88.

The lens mount 95 is the portion that is mounted to the body mount 4 of the camera body 3, and has a lens mount body 95a, a lens mount contact 91 (an example of the electrical contact), an electrical substrate 94, and a light blocking frame 60.

The lens mount body 95a is fixed to the end of the fixed frame 50 on the image plane side. The light blocking frame 60, the lens mount contact 91, and the electrical substrate 94 are fixed to the lens mount body 95a. The light blocking frame 60 is a member that prevents unwanted light from being incident on an imaging sensor 11, and is disposed on the inside of the lens mount body 95a and on the image plane side of the sixth lens group G6. The lens mount contact 91 and the electrical substrate 94 will be discussed below.

The fixed frame 50 is a member that rotatably supports the cam barrel 51, and is fixed to the lens mount body 95a of the lens mount 95. The fixed frame 50 has a protrusion 50a at the end on the Z axis direction positive side, three linear through-grooves 50b disposed at an equal pitch around the optical axis AZ, and three linear through-grooves 50c disposed at an equal pitch around the optical axis AZ. In FIGS. 5 to 8, the linear through-grooves 50b and 50c are drawn so as to be arranged within the same cross section.

The cam barrel 51 has a concave portion 51a provided to the inner periphery, three first cam grooves 51b, three second cam grooves 51c, three third cam grooves 51d, three fourth cam grooves 51e, and three fifth cam grooves 51f. Since the protrusion 50a of the fixed frame 50 is inserted into the concave portion 51a of the cam barrel 51, in a state in which relative movement is restricted in the Z axis direction, the cam barrel 51 is supported by the fixed frame 50 so as to be rotatable with respect to the fixed frame 50.

The first lens group support frame 53 is fixed to the first holder 52 and supports the first lens group G1. The first holder 52 has three cam pins 52a that are disposed at an equal pitch in the circumferential direction. Since the cam pins 52a are inserted into the linear through-grooves 50b, the first holder 52 is able to move straight in the Z axis direction with respect to the fixed frame 50, although its rotation around the optical axis AZ is restricted with respect to the fixed frame 50. Furthermore, since the cam pins 52a are inserted into the first cam grooves 51b of the cam barrel 51, when the cam barrel 51 rotates around the optical axis AZ with respect to the fixed frame 50, the cam pins 52a are guided by the first cam grooves 51b, and the first holder 52 moves straight in the Z axis direction, without rotating with respect to the fixed frame 50. Female threads 52c for attaching a conversion lens and an optical filter, such as a polarizing filter or a protective filter, are formed at the distal end of the first holder 52.

The second lens group support frame 54 supports the second lens group G2 and has three cam pins 54a disposed at an equal pitch in the circumferential direction. The cam pins 54a are inserted into the linear through-grooves 50c, so the second lens group support frame 54 is able to move straight in the Z axis direction with respect to the fixed frame 50, although its rotation around the optical axis AZ is restricted with respect to the fixed frame 50. Furthermore, since the cam pins 54a are inserted into the second cam grooves 51c, when the cam barrel 51 rotates around the optical axis AZ with respect to the fixed frame 50, the cam pins 54a are guided by the second cam grooves 51c, and the second lens group support frame 54 moves straight in the Z axis direction, without rotating with respect to the fixed frame 50.

The third lens group support frame 56 supports a correction lens support frame 55 to which the third lens group G3 is fixed, so as to allow movement perpendicular to the optical axis AZ, and has three cam pins 55a disposed at an equal pitch in the circumferential direction. Since the cam pins 55a are inserted into the linear through-grooves 50c, the third lens group support frame 56 is able to move straight in the Z axis direction with respect to the fixed frame 50, although its rotation around the optical axis AZ is restricted with respect to the fixed frame 50. Furthermore, since the cam pins 55a are inserted into the third cam grooves 51d of the cam barrel 51, when the cam barrel 51 rotates around the optical axis AZ with respect to the fixed frame 50, the cam pins 54a are guided by the third cam grooves 51d, and the third lens group support frame 56 moves straight in the Z axis direction, without rotating with respect to the fixed frame 50.

The fourth lens group support frame 57 supports the fourth lens group G4, and has three cam pins 57a disposed at an equal pitch in the circumferential direction. Since the cam pins 57a are inserted into the linear through-grooves 50c, the fourth lens group support frame 57 is able to move straight in the Z axis direction with respect to the fixed frame 50, although its rotation around the optical axis AZ is restricted with respect to the fixed frame 50. Furthermore, since the cam pins 55a are inserted into the fourth cam grooves 51e of the cam barrel 51, when the cam barrel 51 rotates around the optical axis AZ with respect to the fixed frame 50, the cam pins 55a are guided by the fourth cam grooves 51e, and a fourth lens group unit 78 moves straight in the Z axis direction, without rotating with respect to the fixed frame 50.

As shown in FIGS. 5 to 8, the movement range of the fourth lens group unit 78 using the imaging sensor 11 as a reference is a first movement range F4. Out of this first movement range F4, the position of the fourth lens group unit 78 at the wide angle end is termed the first position F41, and the position of the fourth lens group unit 78 at the telephoto end is termed the second position F42. The reference for the first position F41 and second position F42 is the face of the fourth lens group unit 78 on the image plane side (more precisely, the face of the fourth lens group G4 on the image plane side).

The sixth lens group support frame 59 supports the sixth lens group G6, and has three cam pins 59a disposed at an equal pitch in the circumferential direction. The sixth lens group G6 and the sixth lens group support frame 59 constitute a sixth lens group unit 77 (an example of the second lens unit). Since cam pins 76 are inserted into the linear through-grooves 50c, the sixth lens group support frame 59 is able to move straight in the Z axis direction with respect to the fixed frame 50, although its rotation around the optical axis AZ is restricted with respect to the fixed frame 50. Furthermore, since the cam pins 59a are inserted into the fifth cam grooves 51f of the cam barrel 51, when the cam barrel 51 rotates around the optical axis AZ with respect to the fixed frame 50, the cam pins 59a are guided by the fifth cam grooves 51f, and the sixth lens group unit 77 moves straight in the Z axis direction, without rotating with respect to the fixed frame 50. The sixth lens group unit 77 is disposed on the side nearest to the image plane of the optical system L (the Z axis direction negative side). Therefore, when the interchangeable lens unit 2 is removed from the camera body 3, the sixth lens group G6 can be seen from the lens mount 95.

The fifth lens group support frame 58 supports the fifth lens group G5, and has a bearing part 58a, an anti-rotation part 58b, a rack support 58c, and a protrusion 58d. The fifth lens group G5 and the fifth lens group support frame 58 constitute a focus lens unit 75. The focus lens unit 75 is disposed on the image plane side in the optical system L, and is disposed on the subject side of the sixth lens group unit 77. Accordingly, when the interchangeable lens unit 2 is removed from the camera body 3, it is almost impossible to see the focus lens unit 75 from the lens mount 95, so the user cannot touch the focus lens unit 75.

The sixth lens group support frame 59 supports the rear ends of two guide poles 63a and 63b that extend in the Z axis direction. A first guide pole support plate 65a is a member for supporting the front end of the guide pole 63a, and is fixed on the subject side of the sixth lens group support frame 59. A second guide pole support frame 65b is a member for supporting the front end of the guide pole 63b, and is fixed on the subject side of the sixth lens group support frame 59. The 63a guide pole is inserted in the bearing part 58a, and the guide pole 63b is inserted in the anti-rotation part 58b. The fifth lens group support frame 58 is supported by the guide poles 63a and 63b movably in the Z axis direction in a state in which rotation around the optical axis AZ is restricted.

The rack support 58c is disposed on the Z axis direction positive side of the bearing part 58a, and supports a rack 66 rotatably and movably integrally in the axial direction. The rack 66 has a plurality of teeth (not shown) that mesh with a lead screw 64b (discussed below) of the focus motor 64. The rotary motion of the lead screw 64b is converted into linear motion in the Z axis direction by the rack 66.

A torsion coil spring 68 is attached to the rack support 58c. The torsion coil spring 68 imparts rotational force around the rotational axis R2 (the A direction in FIG. 10) to the rack 66. This rotational force presses the rack 66 against the lead screw 64b. This reduces backlash between the rack 66 and the lead screw 64b, and increases the positional accuracy of the focus lens unit 75. Also, since the rack 66 is constantly pressed against the lead screw 64b, drive force can be more efficiently transmitted from the lead screw 64b to the rack 66.

The torsion coil spring 68 is also compressed in the Z axis direction (the direction parallel to the rotational axis R2) between the rack support 58c and the rack 66. The torsion coil spring 68 imparts a pressing force F to the rack 66 (see FIG. 10), and the torsion coil spring 68 presses the rack 66 against the rack support 58c in the Z axis direction. This reduces movement of the rack 66 in the Z axis direction with respect to the rack support 58c, and further improves the positional accuracy of the focus lens unit 75.

The protrusion 56d is a portion for detecting the starting point of the focus lens unit 75, and is provided at a location that can pass through the detection region of a photosensor 67 (discussed below). In this embodiment, since the fifth lens group G5 (a focus lens group) is constituted by a single lens, the weight of the fifth lens group G5 can be 1 g or less, for example, which allows the drive speed of the focus motor 64 to be higher.

As shown in FIGS. 5 to 8, the movement range of the fourth lens group unit 78 using the imaging sensor 11 as a reference is a second movement range F5. Out of this second movement range F5, the position of the focus lens unit 75 at the wide angle end is termed the first position F51, and the position of the focus lens unit 75 at the telephoto end is termed the second position F52. The reference for the first position F51 and second position F52 is the face of the focus lens unit 75 on the subject side (more precisely, the face of the fifth lens group G5 on the subject side). The first position F51 and second position F52 are the positions of the focus lens unit 75 when the focus lens unit 75 is driven on the basis of an infinity tracking table 100 (discussed below).

As shown in FIGS. 7 and 8, the second movement range F5 overlaps the above-mentioned first movement range F4. The first position F41 is disposed between the first position F51 and the second position F52. The second position F52 is disposed between the first position F41 and the second position F42.

The zoom ring unit 83 has a ring base 86, the zoom ring 84 (an example of the zoom operating unit), and a linear position sensor 87 that detects the rotational position of the zoom ring 84. The "rotational position of the zoom ring 84" refers to the position of the zoom ring 84 in the rotational direction, and can also be considered to be the rotational angle of the zoom ring 84 from a reference position.

The zoom ring 84 has a cylindrical shape, and is supported by the ring base 86 fixed to the fixed frame 50, so as to be movable around the optical axis AZ in a state in which movement in the Z axis direction is restricted. The zoom ring 84 has a through-hole 84a at the end on the Z axis direction negative side. A zoom drive pin 85 that is fixed to the cam barrel 51 is inserted into the through-hole 84a. Consequently, the cam barrel 51 rotates integrally with the zoom ring 84 around the optical axis AZ.

The linear position sensor 87 detects the rotational position and rotational direction in which the user has put the zoom ring 84, and sends the detection result to the lens microcomputer 40. More specifically, the linear position sensor 87 is fixed to the ring base 86 and has a slider 87a that protrudes outward in the radial direction. This slider 87a is inserted into a cam groove 84b formed in the zoom ring 84. When the zoom ring 84 is rotated with respect to the fixed frame 50, the slider 87a moves in the Z axis direction along the cam groove 84b. The linear position sensor 87 has a varistor, and when the slider 87a sliders over a magnetic resistor that is inside this varistor, output (output voltage) that is proportional to the position of the slider 87a in the Z axis direction can be obtained linearly between terminals at both ends to which a specific voltage has been applied. The output of the linear position sensor 87 is converted into rotational position information, which allows the rotational position of the zoom ring 84 to be detected. The focal length of the optical system L is displayed on the outer peripheral face of the zoom ring 84.

Since the first to sixth lens groups G1 to G6 are mechanically linked via the lens support mechanism 71, the absolute positions of the first to sixth lens groups G1 to G6 (for example, positions using as a reference the light receiving face 11a of the imaging sensor 11) have a constant relationship to the rotational position of the zoom ring 84. Therefore, the absolute positions of the first to sixth lens groups G1 to G6 with respect to the lens mount 95, for example, can be ascertained by detecting the rotational position of the zoom ring 84. The zoom ring 84 may have another structure instead, such as a movable lever.

The focus ring unit 88 has a focus ring 89 and a focus ring angle detector 90 that detects the rotational angle of the focus ring 89. The focus ring 89 has a cylindrical shape, and is supported by the ring base 81 rotatably around the optical axis AZ in a state in which movement in the Z axis direction is restricted. The rotational angle and rotational direction of the focus ring 89 can be detected by the focus ring angle detector 90. The focus ring angle detector 90 has two photosensors 90a, for example. The focus ring 89 has a plurality of protrusions 89a that protrude inward in the radial direction and are disposed equidistantly spaced in the rotational direction. Each of these photosensors has a light emitting part (not shown) and a light receiving part (not shown), and the plurality of protrusions 89a pass in between the light emitting parts and the light receiving parts, allowing the rotational angle and rotational direction of the focus ring 89 to be detected. The focus ring 89 may have another structure instead, such as a movable lever.

(3) Focus Adjusting Unit

The focus adjusting unit 72 has the focus motor 64 (an example of a focus actuator, and an example of an actuator), a focus drive controller 41, and the photosensor 67 (an example of a home position detector). The focus motor 64 is fixed to the sixth lens group unit 77 (more precisely, the sixth lens group support frame 59) and drives the focus lens unit 75 in the Z axis direction with respect to the sixth lens group unit 77. The drive of the focus lens unit 75 with respect to the sixth lens group unit 77 is performed by the focus motor 64 alone. In other words, in a state in which the focus motor 64 is not driving the focus lens unit 75 (such as when no power is being supplied to the focus motor 64), the focus lens unit 75 cannot be moved with respect to the sixth lens group unit 77. In this case, the focus lens unit 75 moves in the Z axis direction integrally with the sixth lens group unit 77.

The focus motor 64 is a stepping motor equipped with an encoder, and is fixed to the sixth lens group support frame 59 of the sixth lens group unit 77. More specifically, as shown in FIG. 11, the focus motor 64 has a stepping motor 64d and an encoder 64e (an example of a detector).

The stepping motor 64d has a motor body 64s (an example of an actuator body) and a drive shaft 64a that protrudes from the motor body 64s on the Z axis direction positive side (subject side). We can also say that the motor body 64s is provided to the end of the drive shaft 64a on the Z axis direction negative side (image plane side). The motor body 64s has a stator, and is disposed on the outer peripheral side of the sixth lens group G6. The lead screw 64b is integrally formed on the drive shaft 64a. The lead screw 64b is disposed on the Z axis direction positive side of the motor body 64s, and meshes with the rack 66.

A motor holder 64m is fixed to the stepping motor 64d. The motor holder 64m has a holder body 64c and a distal end receiver 64h. The holder body 64c is a rectangular plate that extends parallel to the rotational axis R1 of the drive shaft 64a. The distal end receiver 64h is integrally formed with the holder body 64c, and rotatably supports the end of the drive shaft 64a. The drive shaft 64a is supported in the thrust direction (a direction parallel to the rotational axis R1) by the distal end receiver 64h and a leaf spring 64i. The drive shaft 64a is supported in the radial direction by the distal end receiver 64h and a bearing 64j.

The encoder 64e is a unit for detecting the rotation of the drive shaft 64a, and is provided to the end of the stepping motor 64d. The encoder 64e is disposed on the outer peripheral side of the sixth lens group G6, and has a sensor magnet 64f and a magnetic sensor 64g. The encoder 64e is protected by a sensor protecting cover 64k fixed to the stepping motor 64d.

The sensor magnet 64f is a cylindrical member that is fixed to the outer peripheral part of the drive shaft 64a. N and S poles are alternately magnetized in the peripheral direction on the outer peripheral part of the sensor magnet 64f. The magnetic sensor 64g, which is used for angle detection, is disposed on the outer peripheral side of the sensor magnet 64f so as to be opposite the sensor magnet 64f in the radial direction.

The magnetic sensor 64g is a two-phase magnetoresistance effect type of sensor, and is constituted by MR elements having a ferromagnetic thin film. These MR elements are provided in the drive direction at a spacing that is one-quarter the magnetization pitch, from the N pole to the S pole of the sensor magnet 64f. The magnetic sensor 64g is disposed with respect to the sensor magnet 64f in a direction in which the orientation of the current flowing to the MR elements is perpendicular to the magnetization direction of the sensor magnet 64f.

If we let the voltage applied to the magnetic sensor 64g be an output signal, this output signal becomes two sinusoidal waveforms whose phases differ by 90° (such as about 100 wavelengths per rotation). The detection resolution can be improved by subjecting these two signal waveforms to modulated interpolation with a signal processing circuit (not shown) in the lens microcomputer 40.

The lens microcomputer 40 calculates electrical phase information and angle information about the drive shaft 64a on the basis of the count values for electrical phase and angle processed by the signal processing circuit. The lens microcomputer 40 calculates a drive command value from the computed angle information and electrical phase information. The focus drive controller 41 sends drive current to the focus motor 64 according to this drive command value, thereby controlling the drive of the focus motor 64.

Thus, the rotational angle and torque of the drive shaft 64a can be controlled, and faster response, lower power consumption, and quieter operation can be achieved by using an encoder-equipped stepping motor as the focus motor 64 to perform closed loop control.

Furthermore, since the rotational angle of the drive shaft 64a is always being managed by the encoder 64e, there is no step-out, which can be a problem with conventional stepping motors. Thus, employing an encoder-equipped stepping motor as the focus motor 64 makes it possible to increase the speed to over 3000 pps, which is about four times the 800 pps of an ordinary stepping motor.

As to the counting of the number of drive pulses mentioned above, when an encoder-equipped stepping motor is used as the focus motor 64, the output value of the magnetic sensor 64g may also be counted.

The rotary motion of the drive shaft 64a generated by the focus motor 64 is converted into linear motion in the Z axis direction of the focus lens unit 75 by the rack 66. Consequently, the focus lens unit 75 is able to move in the Z axis direction with respect to the sixth lens group unit 77.

With this digital camera 1, in order to realize a zoom lens system with which the subject distance is kept substantially constant while the focal length can be varied, the focus lens unit 75 is driven by the focus adjusting unit 72 on the basis of a tracking table that has been stored in the lens microcomputer 40. This tracking system will be called electronic tracking here.

The tracking table is information indicating the position of the focus lens unit 75 at which the subject distance at which the subject is in focus even if the focal length changes is held substantially constant (more precisely, the position of the focus lens unit 75 with respect to the sixth lens group unit 77). Saying that the subject distance is substantially constant means that the amount of change in the subject distance is within a specific subject field depth. Electronic tracking will be discussed below.

A photosensor 67, which detects the starting point position of the focus lens unit 75, is installed in the sixth lens group unit 77. This photosensor 67 has a light emitting part (not shown) and a light receiving part (not shown). When the protrusion 56d of the third lens group support frame 56 passes between the light emitting part and the light receiving part, the photosensor 67 can detect the presence of the protrusion 56d. That is, the starting point position of the focus lens unit 75 with respect to the sixth lens group unit 77 can be detected by the photosensor 67. In other words, the photosensor 67 is a starting point detector that detects the starting point position of the third lens group G3 with respect to the second lens group G2. The lens microcomputer 40 drives the third lens group G3 to the starting point position, and checks whether the focus lens unit 75 (the third lens group G3) is in the starting point position by using a signal from the photosensor 67.

The starting point position that can be detected by the photosensor 67 is an absolute position that never moves with respect to the sixth lens group unit 77. Accordingly, when the position of the focus lens unit 75 is reset to the starting point position with respect to the sixth lens group unit 77, the focus lens unit 75 is driven to the position where the protrusion 56d for starting point detection is detected by the photosensor 67. For example, when a power switch 25 of the digital camera 1 is turned off, the focus motor 64 drives the focus lens unit 75 to the position where the protrusion 56d of the third lens group support frame 56 is detected by the photosensor 67, regardless of the current position of the focus lens unit 75. Upon completion of the drive of the focus lens unit 75, the power to the digital camera 1 is turned off. Conversely, when the power switch 25 of the digital camera 1 is turned on, the focus motor 64 drives the focus lens unit 75 to a specific position determined on the basis of the tracking table. The starting point detector is not limited to being a photosensor, and may instead be a combination of a magnet and a magnetic sensor, for example.

(4) Aperture Adjusting Unit

The aperture adjusting unit 73 has the aperture unit 62 fixed to the third lens group support frame 56, an aperture drive motor (not shown) that drives the aperture unit 62, and an aperture drive controller 42 that controls the aperture drive motor. The aperture drive motor is a stepping motor, for example. The aperture drive motor is driven on the basis of a drive signal inputted from the aperture drive controller 42. The drive force generated by the aperture drive motor drives aperture blades 62a in the opening and closing directions. The aperture value of the optical system L can be changed by driving the aperture blades 62a.

(5) Blur Correction Unit

The blur correction unit 74 is for reducing blurring of the optical image attributable to movement of the interchangeable lens unit 2 and the camera body 3, and has an electromagnetic actuator 46, a position detecting sensor 47, and a blur correction microcomputer 48.

The electromagnetic actuator 46 drives the correction lens support frame 55 in a direction perpendicular to the optical axis AZ. More specifically, the electromagnetic actuator 46 has a magnet (not shown) and a coil (not shown), for example. For instance, the coil is provided to the correction lens support frame 55, and the magnet is fixed to the third lens group support frame 56.

The position detecting sensor 47 is for detecting the position of the correction lens support frame 55 with respect to the third lens group support frame 56, and is a Hall element, for example. A movement detecting sensor (not shown) such as a gyro sensor is installed in the interchangeable lens unit 2. The blur correction microcomputer 48 controls the electromagnetic actuator 46 on the basis of the detection result of the position detecting sensor 47 and the detection result of the movement detecting sensor. Consequently, blurring of the optical image attributable to movement of the digital camera 1 can be reduced.

Reducing blurring of the subject image may instead be accomplished by electronic blur correction, in which blurring that appears in an image is corrected on the basis of image data outputted from the imaging sensor 11. Also, blurring of the optical image may be reduced by a sensor shift method in which the imaging sensor 11 is driven in two directions perpendicular to the optical axis AZ.

(6) Lens Microcomputer

The lens microcomputer 40 has a CPU (not shown), a ROM (not shown), and a memory 40*a*, and various functions can be performed by reading programs stored in the ROM into the CPU. For instance, the lens microcomputer 40 can check whether the focus lens unit 75 is in the starting point position by using a detection signal from the photosensor 67.

The memory 40*a* is a nonvolatile memory, and can hold stored information even when no power is being supplied. The memory 40*a* contains a tracking table (discussed below) for realizing a zoom lens system, or information related to the interchangeable lens unit 2 (lens information), for example. The lens microcomputer 40 controls the focus motor 64, and the focus lens unit 75 is driven by the focus motor 64 in the Z axis direction, on the basis of this tracking table. An operation in which the position of the focus lens unit 75 is made to conform to changes in the focal length on the basis of a tracking table will hereinafter be referred to as electronic tracking.

The lens microcomputer 40 has a counter 40*b* for counting the number of pulses of the focus motor 64. The counter 40*b* is set to a count of "+1" when the focus lens unit 75 is driven to the Z axis direction positive side, and to a count of "−1" when the focus lens unit 75 is driven to the Z axis direction negative side. The lens microcomputer 40 can ascertain the relative position of the third lens group G3 with respect to the second lens group G2 (the position of the focus lens unit 75 with respect to the sixth lens group unit 77) by thus counting the number of drive pulses of the focus motor 64 by the counter 40*b*.

For example, the rack 66 is driven by 0.3 mm in the Z axis direction for every rotation of the lead screw 64*b* of the focus motor 64. If the focus motor 64, which has a 10-pole magnet (not shown), is driven by 1-2 phase excitation, then the rack 66 is driven in the Z axis direction by 0.3/20/2=0.0075 mm (7.5 μm) per pulse. During micro-step drive, the rack 66 can be driven in even finer units. Using a stepping motor allows the focus lens unit 75 to be driven in fine units, and reduces backlash during reverse drive, for example. That is, selecting a stepping motor as the focus motor 64 affords very precise focus adjustment. Also, counting the number of drive pulses allows the current position of the focus lens unit 75 with respect to the sixth lens group unit 77 to be ascertained, and allows the amount of drive of the focus lens unit 75 to be calculated.

Camera Body

The basic configuration of the camera body 3 will be described through reference to FIGS. 1 to 4B. As shown in FIGS. 1 to 4B, the camera body 3 has a case 3*a*, a body mount 4, a control unit 39, an image acquisition unit 35, an image display unit 36, a viewfinder unit 38, a body microcomputer 10, and a battery 22.

(1) Case

The case 3*a* constitutes the outer part of the camera body 3. As shown in FIGS. 4A and 4B, the body mount 4 is provided to the front face of the case 3*a*, and the control unit 39 is provided to the rear and top faces of the case 3*a*. More specifically, a display unit 20, the power switch 25, a mode selector dial 26, a navigation key 27, a menu setting button 28, a setting button 29, a mode selector button 34, and a moving picture capture operation button 24 are provided to the rear face of the case 3*a*. A shutter button 30 is provided to the top face of the case 3*a*.

(2) Body Mount

The body mount 4 is the portion where the lens mount 95 of the interchangeable lens unit 2 is mounted, and has a body-side contact (not shown) that can be electrically connected with the lens mount contact 91. The camera body 3 is able to send and receive data to and from the interchangeable lens unit 2 via the body mount 4 and the lens mount 95. For example, the body microcomputer 10 (discussed below) sends the lens microcomputer 40 a control signal, such as an exposure synchronization signal, via the body mount 4 and the lens mount 95.

(3) Control Unit

As shown in FIGS. 4A and 4B, the operating unit 39 has various controls that the user can use to input operating information. For instance, the power switch 25 is a switch for turning the power on and off to the digital camera 1 or the camera body 3. When the power is turned on with the power switch 25, power is supplied to the various parts of the camera body 3 and the interchangeable lens unit 2.

The mode selector dial 26 is used to switch the operating mode, such as still picture capture mode, moving picture capture mode, or reproduction mode, and the user can turn the mode selector dial 26 to switch the operating mode. When the still picture capture mode is selected with the mode selector dial 26, the operating mode is switched to the still picture capture mode, and when the moving picture capture mode is selected with the mode selector dial 26, the operating mode is switched to the moving picture capture mode. In the moving picture capture mode, basically moving picture capture is possible. When the reproduction mode is selected with the mode selector dial 26, the operating mode is switched to the reproduction mode, allowing the captured image to be displayed on the display unit 20.

The navigation key 27 is used to select the left, right, up, and down directions. The user can use the navigation key 27 to select the desired menu from various menu screens displayed on the display unit 20, for example.

The menu setting button 28 is for setting the various operations of the digital camera 1. The setting button 29 is for executing the operations of the various menus.

The moving picture capture operation button 24 is for starting and stopping the capture of moving pictures. Even if the operating mode selected with the mode selector dial 26 is the still picture capture mode or the reproduction mode, when the moving picture capture operation button 24 is pressed, the operating mode is forcibly changed to the moving picture capture mode, and moving picture capture begins, regardless of the setting on the mode selector dial 26. When this moving picture capture operation button 24 is pressed during the capture of a moving picture, the moving picture capture ends and the operating mode changes to the one selected on the mode selector dial 26, that is, to the one prior to the start of moving picture capture. For example, if the still picture capture mode has been selected with the mode selector dial 26 when the moving picture capture operation button 24 is pressed, the operating mode automatically changes to the still picture capture mode after the moving picture capture operation button 24 is pressed again.

The shutter button 30 is pressed by the user to capture an image. When the shutter button 30 is pressed, a timing signal is outputted to the body microcomputer 10. The shutter button 30 is a two-stage switch that can be pressed half way down or all the way down. Light measurement and ranging are commenced when the user presses the button half way down. When the user presses the shutter button 30 all the way down in a state in which the shutter button 30 has been pressed half way down, a timing signal is outputted, and image data is acquired by the image acquisition unit 35.

As shown in FIG. 2, a lens attachment button 99 (an example of the lens attachment operating unit) for attaching and removing the interchangeable lens unit 2 to and from the camera body 3 is provided to the front face of the camera body 3. The lens attachment button 99 has a contact (not shown) that is in its "on" state when the button is pressed by the user, for example, and is electrically connected to the body microcomputer 10. When the lens attachment button 99 is pressed, the built-in contact is switched on, and the body microcomputer 10 recognizes that the lens attachment button 99 has been pressed.

(4) Image Acquisition Unit

The image acquisition unit 35 mainly comprises the imaging sensor 11 (an example of the imaging element) such as a CCD (Charge Coupled Device) that performs opto-electrical conversion, a shutter unit 33 that adjusts the exposure state of the imaging sensor 11, a shutter controller 31 that controls the drive of the shutter unit 33 on the basis of a control signal from the body microcomputer 10, and an imaging sensor drive controller 12 that controls the operation of the imaging sensor 11.

The imaging sensor 11 is a CCD (Charge Coupled Device) sensor, for example, that converts the optical image formed by the optical system L into an electrical signal. The imaging sensor 11 is driven and controlled on the basis of timing signals generated by the imaging sensor drive controller 12. The imaging sensor 11 may instead be a CMOS (Complementary Metal Oxide Semiconductor) sensor.

The shutter controller 31 drives a shutter drive actuator 32 and operates the shutter unit 33 according to a control signal outputted from the body microcomputer 10 that has received a timing signal.

The auto-focusing method that is employed in this embodiment is a contrast detection method that makes use of image data produced by the imaging sensor 11. Using a contrast detection method allows high-precision focal adjustment.

(5) Body Microcomputer

The body microcomputer 10 is a control device that is the command center of the camera body 3, and controls the various components of the digital camera 1 according to operation information inputted to the operation unit 39. More specifically, the body microcomputer 10 is equipped with a CPU, ROM, and RAM, and the programs held in the ROM are read by the CPU, allowing the body microcomputer 10 to perform a variety of functions. For instance, the body microcomputer 10 has the function of detecting that the interchangeable lens unit 2 has been mounted to the camera body 3, or the function of acquiring information about controlling the digital camera 1, such as information about the focal length from the interchangeable lens unit 2.

The body microcomputer 10 is able to receive signals from the power switch 25, the shutter button 30, the mode selector dial 26, the navigation key 27, the menu setting button 28, and the setting button 29. Various information related to the camera body 3 is held in a memory 10a inside the body microcomputer 10. The memory 10a is a nonvolatile memory, and can hold stored information even when no power is being supplied.

Also, the body microcomputer 10 periodically produces a vertical synchronization signal, and produces an exposure synchronization signal on the basis of the vertical synchronization signal in parallel with the production of the vertical synchronization signal. The body microcomputer 10 can produce an exposure synchronization signal, since the body microcomputer 10 ascertains beforehand the exposure start timing and the exposure stop timing based on the vertical synchronization signal. The body microcomputer 10 outputs a vertical synchronization signal to a timing generator (not shown), and outputs an exposure synchronization signal at a specific period to the lens microcomputer 40 via the body mount 4 and the lens mount 95. The lens microcomputer 40 acquires position information about the focus lens unit 75.

The imaging sensor drive controller 12 produces an electronic shutter drive signal and a read signal of the imaging sensor 11 at a specific period on the basis of the vertical synchronization signal. The imaging sensor drive controller 12 drives the imaging sensor 11 on the basis of the electronic shutter drive signal and the read signal. That is, the imaging sensor 11 reads to a vertical transfer part (not shown) the image data produced by numerous opto-electrical conversion element (not shown) present in the imaging sensor 11, according to the read signal.

The body microcomputer 10 also controls the focus adjusting unit 72 (discussed below) via the lens microcomputer 40.

The image signal outputted from the imaging sensor 11 is sent from an analog signal processor 13 and successively processed by an A/D converter 14, a digital signal processor 15, a buffer memory 16, and an image compressor 17. The analog signal processor 13 subjects the image signal outputted from the imaging sensor 11 to gamma processing or other such analog signal processing. The A/D converter 14 converts the analog signal outputted from the analog signal processor 13 into a digital signal. The digital signal processor 15 subjects the image signal converted into a digital signal by the A/D converter 14 to digital signal processing such as noise elimination or contour enhancement. The buffer memory 16 is a RAM (Random Access Memory), and temporarily stores the image signal. The image signal stored in the buffer memory 16 is sent to and processed by first the image compressor 17 and then an image recorder 18. The image signal stored in the buffer memory 16 is read at a command from an image recording controller 19 and sent to the image compressor 17. The data of the image signal sent to the image compressor 17 is compressed into an image signal according to a command from the image recording controller 19. This compression adjusts the image signal to a smaller data size than that of the original data. An example of the method for compressing the image signal is the JPEG (Joint Photographic Experts Group) method in which compression is performed on the image signal for each frame. After this, the compressed image signal is recorded by the image recording controller 19 to the image recorder 18. When a moving picture is recorded, JEPG was used to compress a plurality of image signals, compressing an image signal for each frame, and an H. 264/AVC method can also be used, in which compression is performed on image signals for a plurality of frames all at once.

The image recorder 18 produces a still picture file or moving picture file that is associated with specific information to be recorded with the image signal. The image recorder 18 also records the still picture file or moving picture file on the basis of a command from the image recording controller 19. The image recorder 18 is a removable memory and/or an internal memory, for example. The specific information to be recorded with the image signal includes the date the image was captured, focal length information, shutter speed information, aperture value information, and photography mode information. Still picture files are in Exif (TRADEMARK) format or a format similar to Exif (TRADEMARK) format. Moving picture files are in H. 264/AVC format or a format similar to H. 264/AVC format.

(6) Image Display Unit

The image display unit 36 has the display unit 20 and an image display controller 21. The display unit 20 is a liquid crystal monitor, for example. The display unit 20 displays as a visible image the image signal recorded to the buffer memory 16 or the image recorder 18 on the basis of a command from the image display controller 21. Possible display modes on the display unit 20 include a display mode in which only the image signal is displayed as a visible image, and a display mode in which the image signal and information from the time of capture are displayed as a visible image.

(7) Viewfinder

The viewfinder unit 38 has a liquid crystal viewfinder 8 that displays the image acquired by the imaging sensor 11, and a viewfinder eyepiece window 9 provided to the rear face of the case 3*a*. The user looks into the viewfinder eyepiece window 9 to view the image displayed on the liquid crystal viewfinder 8.

(8) Battery

The battery 22 supplies power to the various components of the camera body 3, and also supplies power to the interchangeable lens unit 2 via the lens mount 95. In this embodiment, the battery 22 is a rechargeable battery. The battery 22 may be a dry cell, or may be an external power supply, with which power is supplied from the outside through a power cord.

Tracking Table

Figure 12:
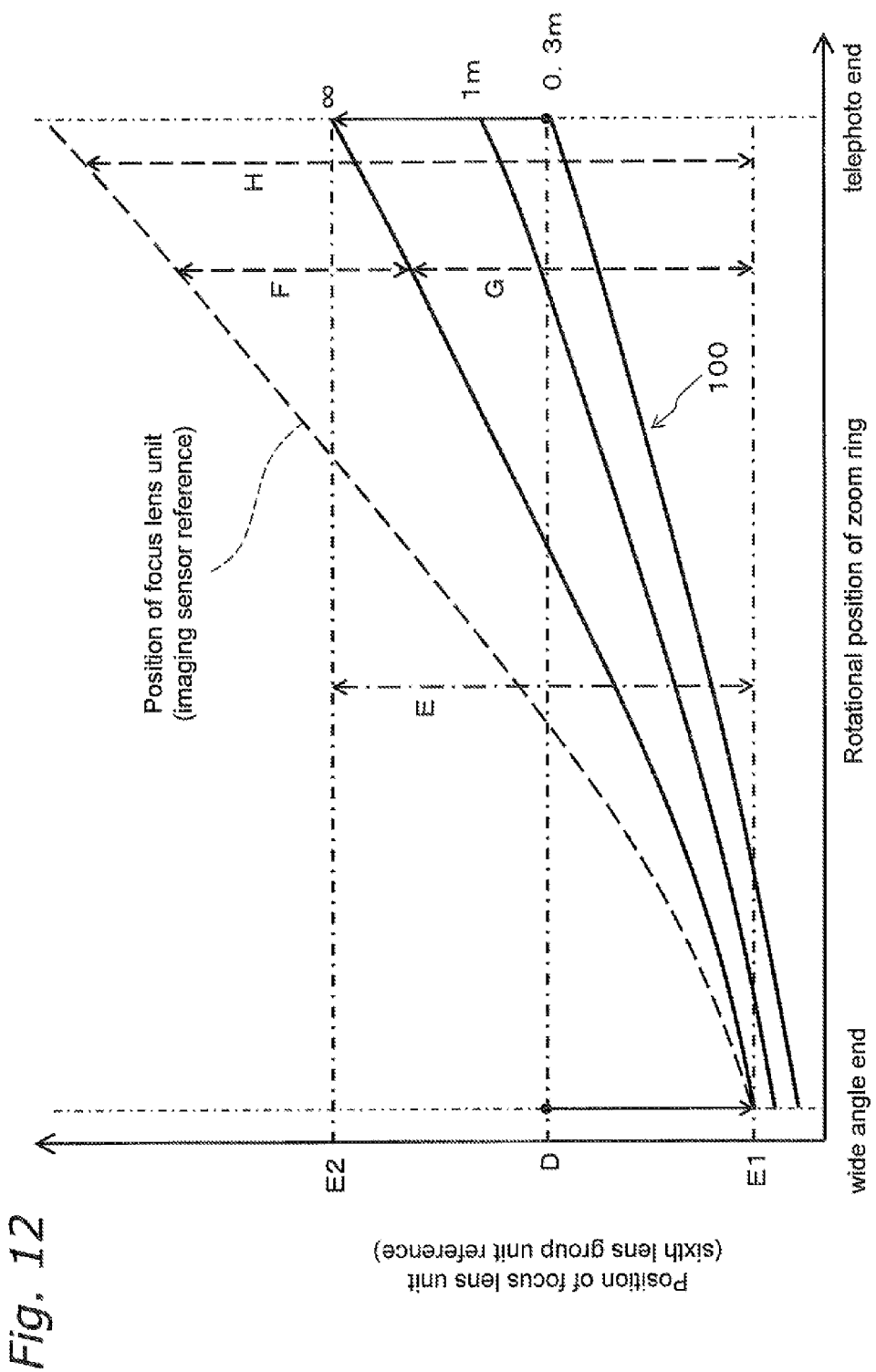
FIG. 12 is a tracking table for realizing a zoom lens system.

With the digital camera 1, electronic tracking is performed by the focus adjusting unit 72 so that the focal length can be varied while the subject distance is kept substantially constant. More specifically, as shown in FIG. 12, to perform electronic tracking, tracking information including a tracking table 100 is held in the memory 40*a*. This tracking table 100 shows the relationship between the rotational position of the zoom ring 84 and the position of the focus lens unit 75 in the Z axis direction with respect to the sixth lens group unit 77. For example, the memory 40*a* holds three tracking tables 100 corresponding to subject distances of 0.3 m, 1.0 m, and infinity (∞).

The tracking table 100 consists of discrete information in which the rotational position of the zoom ring 84 and the position of the focus lens unit 75 in the Z axis direction are divided into several groups. In general, the number of divisions is determined so that the subject distance will fit within a specific subject field depth even if the zoom ring 84 is turned.

The rotational position of the zoom ring 84 (position in the rotational direction) can be detected by the linear position sensor 87. On the basis of this detection result and the tracking table 100, the lens microcomputer 40 can determine the position of the focus lens unit 75 in the Z axis direction with respect to the sixth lens group unit 77.

As shown in FIG. 12, each tracking table 100 is shown as a curve that gently curves from the wide angle end to the telephoto end. While the state of the optical system L is changing from the wide angle end to the telephoto end, the focus lens unit 75 moves away from the sixth lens group unit 77.

This tracking table 100 does not have an inflection point between the wide angle end and the telephoto end. An inflection point is the point at which the drive direction of the focus lens unit 75 changes while the zoom ring 84 is operated from the wide angle end to the telephoto end. That is, the lens microcomputer 40 controls the focus motor 64 so that the focus lens unit 75 is driven in one direction with respect to the sixth lens group unit 77 when the sixth lens group unit 77 is being driven by the zoom ring unit 83 in that direction with respect to the imaging sensor 11.

Also, the sixth lens group G6 (the sixth lens group unit 77) moves away from the imaging sensor 11 (upward in FIG. 12) while the state of the optical system L is changing from the wide angle end to the telephoto end. That is, in this embodiment, the movement direction of the sixth lens group unit 77 with respect to the imaging sensor 11 is the same as the movement direction of the focus lens unit 75 with respect to the sixth lens group unit 77.

If the focus lens unit 75 is driven on the basis of the infinity tracking table 100 shown in FIG. 12, as the sixth lens group unit 77 moves by a distance F in the Z axis direction with respect to the imaging sensor 11, the focus lens unit 75 moves by a distance G in the Z axis direction with respect to the sixth lens group unit 77. As a result, the focus lens unit 75 moves by a distance H, which is the sum of the distances G and F, in the Z axis direction with respect to the imaging sensor 11.

Thus, since the movement distance of the sixth lens group unit 77 is added to the drive distance of the focus lens unit 75, a sufficiently large movement distance of the focus lens unit 75 with respect to the imaging sensor 11 can be ensured.

The starting point position D of the focus lens unit 75 with respect to the sixth lens group unit 77 is detected by the photosensor 67, which is indicated by the one-dot chain line in FIG. 12. In this embodiment, the starting point position D is located in the center of the third movement range E of the focus lens unit 75 (between the first position E1 and the second position E2) in the infinity tracking table 100. The first position E1 is the position of the focus lens unit 75 corresponding to the wide angle end in the infinity tracking table 100. The second position E2 is the position of the focus lens unit 75 corresponding to the telephoto end in the infinity tracking table 100.

Thus disposing the starting point position D in the center allows the focus lens unit 75 to be moved relatively quickly to any position when the power is turned on to the digital camera 1.

The reason the starting point position D is determined using the infinity tracking table 100 as a reference is that there is a higher probability of capturing the subject at the infinity position when the user turns on the power to the digital camera 1 to photograph the subject.

The tracking table 100 may also be expressed by a polynomial, rather than discrete information divided into several groups. Position information about the first lens group G1, second lens group G2, or fourth lens group G4 in the Z axis direction may also be used instead of the rotational position of the zoom ring 84. The "position of the focus lens unit 75 in the Z axis direction with respect to the sixth lens group unit 77" can be rephrased as the position of the third lens group G3 in the Z axis direction with respect to the sixth lens group unit 77, or the position of the third lens group G3 in the Z axis direction with respect to the second lens group G2.

Detailed Configuration of Lens Mount

Figure 13:
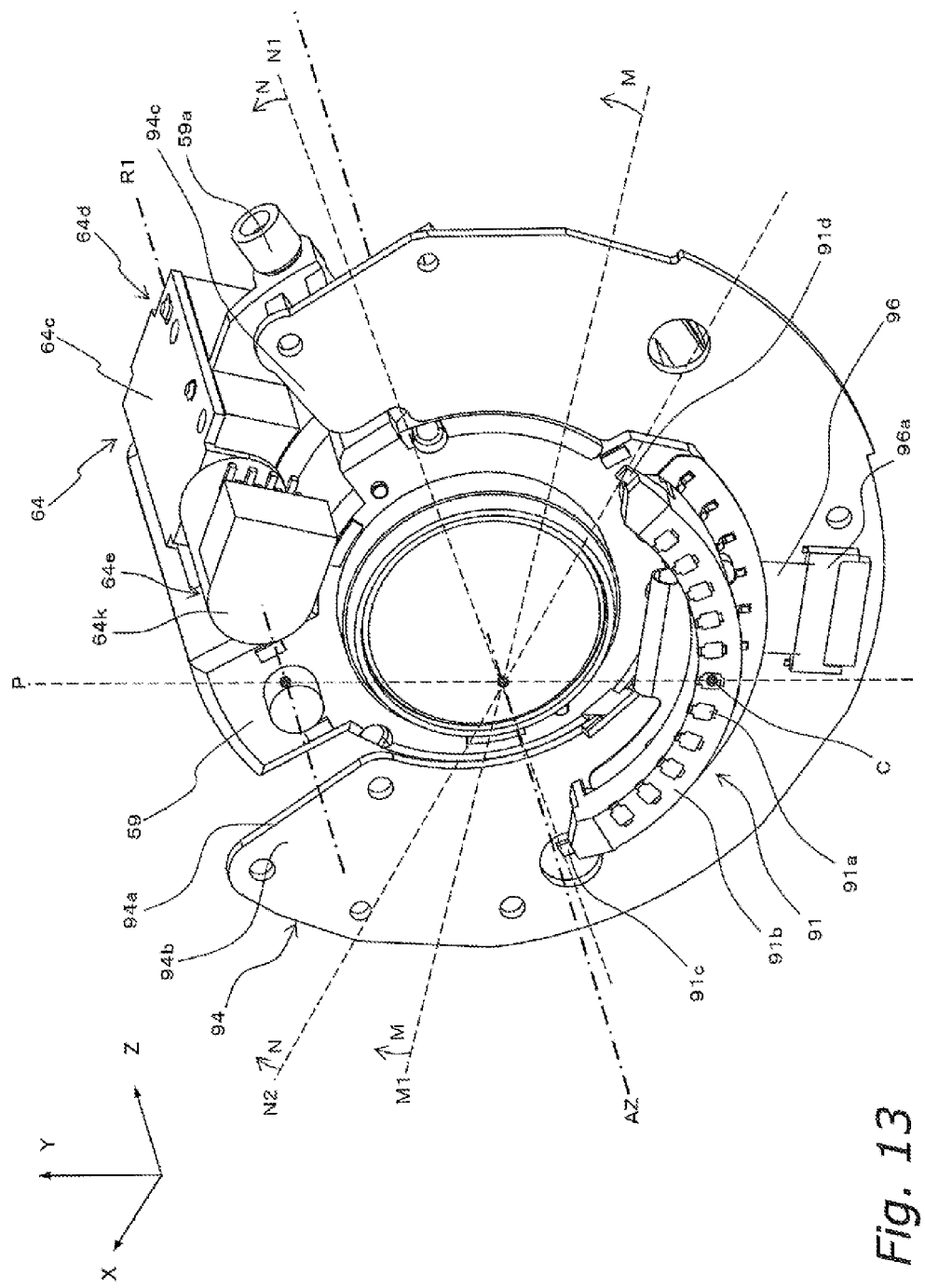
FIG. 13 is an oblique view of the area around an electrical substrate and a lens mount contact.
Figure 14:
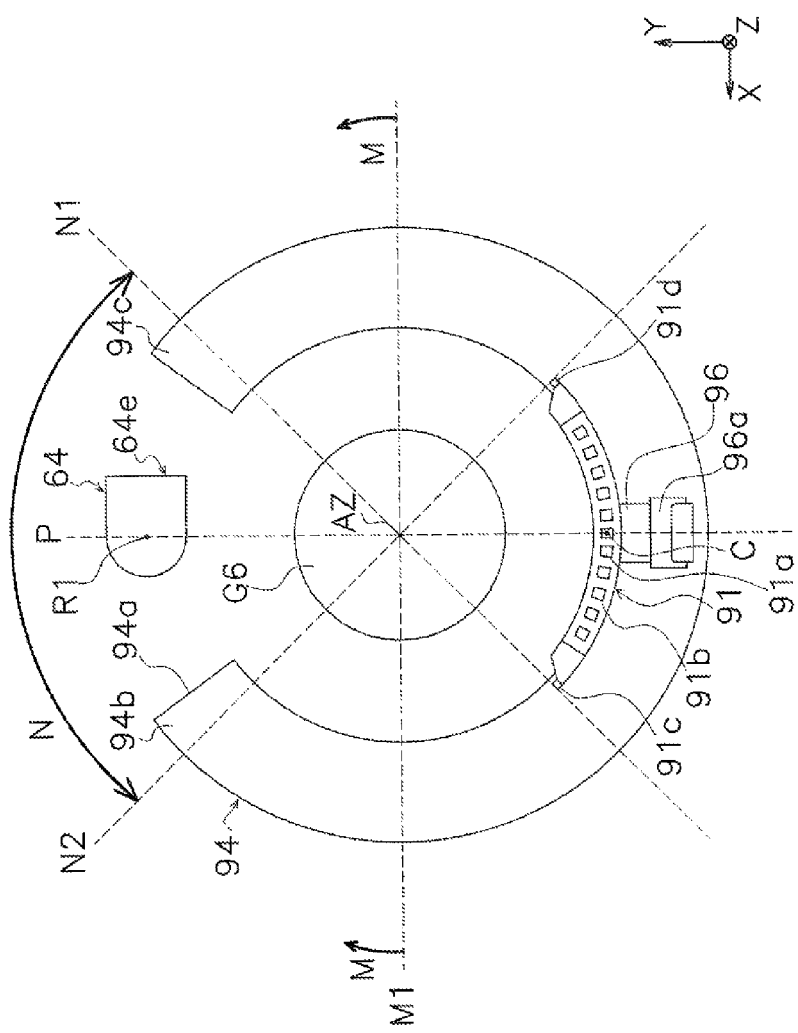
FIG. 14 is a plan view of the area around an electrical substrate and a lens mount contact.

The lens mount 95 will be described in detail through reference to FIGS. 13 and 14. FIG. 13 is a simplified oblique view of the area around the lens mount contact 91 and the electrical substrate 94 when viewed from the imaging sensor 11 side. FIG. 14 is a simplified plan view of the area around the lens mount contact 91 and the electrical substrate 94 when viewed from the imaging sensor 11 side. FIG. 13 shows the state at the wide angle end, which corresponds to the state shown in FIGS. 5 and 6, for example.

As discussed above, the lens mount 95 has the lens mount body 95a, the lens mount contact 91 (an example of the electrical contact), the electrical substrate 94, and the light blocking frame 60.

The lens mount contact 91 can be electrically connected to a body mount contact (not shown) provided to the body mount 4, and has a plurality of electrical contacts 91a (11 electrical contacts 91a in this embodiment), a contact support frame 91b that supports the electrical contacts 91a, a flexible printed cable 96, and a connector 96a.

The electrical contacts 91a are disposed at an equal pitch in the direction along an arc whose center is the optical axis AZ. The contact support frame 91b is an arc-shaped member whose center is the optical axis AZ. The flexible printed cable 96 is connected to the electrical contacts 91a. The connector 96a electrically connects the flexible printed cable 96 and the electrical substrate 94.

The electrical substrate 94 is disposed on the subject side of the lens mount body 95a, and is fixed to the lens mount body 95a. Electronic components such as the lens microcomputer 40 are mounted to the electrical substrate 94. The electrical substrate 94 is electrically connected to the lens mount contact 91 via the connector 96a.

As shown in FIGS. 13 and 14, when viewed in the Z axis direction, the lens mount contact 91 is disposed on the opposite side from the focus motor 64 with respect to the sixth lens group G6. More precisely, if we let the line that passes through the center C of the lens mount contact 91 and is perpendicular to the optical axis AZ of the sixth lens group G6 be a first imaginary line P, the focus motor 64 is disposed on the opposite side from the lens mount contact 91 with respect to a second imaginary line M1 that is perpendicular to the first imaginary line P and the optical axis AZ. That is, in FIGS. 13 and 14, the focus motor 64 is disposed within the range M that is above the second imaginary line M1.

Also, the focus motor 64 is disposed at a position that is symmetrical with the lens mount contact 91 using the optical axis AZ of the sixth lens group G6 as a reference (more precisely, around the center C of the lens mount contact 91). More precisely, the contact support frame 91b has a first end 91c and a second end 91d. We will let the line that is perpendicular to the optical axis AZ and passes through the first end 91c be a third imaginary line N1, and let the line that is perpendicular to the optical axis AZ and passes through the second end 91d be a fourth imaginary line N2. When the focus motor 64 is said to be disposed at a position that is symmetrical with the lens mount contact 91 using the optical axis AZ as a reference, it means that when viewed in the Z axis direction, the focus motor 64 is disposed within a range N between the third imaginary line N1 and the fourth imaginary line N2.

The first imaginary line P overlaps the focus motor 64, and intersects the rotational axis R1 of the focus motor 64. That is, the rotational axis R1, the optical axis AZ, and the center C of the lens mount contact 91 are all disposed on the same straight line when viewed in the Z axis direction.

Since the lens mount contact 91 is thus disposed on the opposite side from the focus motor 64 with respect to the sixth lens group G6, the focus motor 64 can be disposed at a position away from the lens mount contact 91. This means that the encoder 64e of the focus motor 64 will be less affected by noise generated by the lens mount contact 91, and there will be less of a decrease in the detection accuracy of the encoder 64e.

Also, the connector 96a is disposed on the opposite side from the focus motor 64 with respect to the sixth lens group G6 when viewed in the Z axis direction. More precisely, the connector 96a is disposed on the opposite side from the focus motor 64 with respect to the lens mount contact 91. That is, the connector 96a is disposed farther away from the focus motor 64 than the lens mount contact 91. Furthermore, when viewed in the Z axis direction, the connector 96a overlaps the first imaginary line P. Consequently, the encoder 64e is less likely to be affected by noise generated by the connector 96a.

Also, the electrical substrate 94 is disposed on the outer peripheral side of the sixth lens group G6 so as to surround the sixth lens group G6, and has a cut-out 94a at a position corresponding to the focus motor 64. More precisely, the electrical substrate 94 is roughly C-shaped, and has a first substrate end 94b and a second substrate end 94c disposed to the sides of the focus motor 64. The cut-out 94a is formed by the first substrate end 94b and the second substrate end 94c.

Since the electrical substrate 94 is thus roughly C-shaped, rather than being annular, even though the electrical substrate 94 is disposed within the range of movement of the focus motor 64 in the Z axis direction, the focus motor 64 does not come into contact with the electrical substrate 94. Accordingly, the interchangeable lens unit 2 can be more compact.

Operation of the Digital Camera

The operation of the digital camera 1 will be described.

(1) Imaging Mode

This digital camera 1 has two imaging modes. More specifically, the digital camera 1 has a viewfinder imaging mode in which the user looks through the viewfinder eyepiece window 9 to view the subject, and a monitor imaging mode in which the user observes the subject on the display unit 20.

With the viewfinder imaging mode, the image display controller 21 drives the liquid crystal viewfinder 8, for example. As a result, an image of the subject (a so-called through-image) acquired by the imaging sensor 11 is displayed on the liquid crystal viewfinder 8.

With the monitor imaging mode, the display unit 20 is driven by the image display controller 21, for example, and a real-time image of the subject is displayed on the display unit 20. Switching between these two imaging modes can be performed with the mode selector button 34.

(2) Zoom Operation

Next, the operation of the interchangeable lens unit 2 when the user performs zooming will be described.

When the user rotates the zoom ring 84, the cam barrel 51 rotates along with the zoom ring 84. When the cam barrel 51 rotates around the optical axis AZ, the first holder 52 is guided by the first cam grooves 51b of the cam barrel 51, and moves linearly in the Z axis direction with respect to the fixed frame 50. The second lens group support frame 54, the third lens group support frame 56, the fourth lens group unit 78, and the sixth lens group unit 77 are also guided by the second cam grooves 51c, the third cam grooves 51d, the fourth cam grooves 51e, and the fifth cam grooves 51f of the cam barrel 51, and move linearly in the Z axis direction with respect to the fixed frame 50. Thus, by rotating the zoom ring 84, the state of the interchangeable lens unit 2 can be changed from the wide angle end state shown in FIGS. 5 and 6 to the telephoto end state shown in FIGS. 7 and 8. Consequently, the subject can be imaged at the desired zoom position by adjusting the rotational position of the zoom ring 84.

The sixth lens group unit 77 is mechanically driven in the Z axis direction by rotating the zoom ring 84 here, but only the focus lens unit 75 is electrically driven and controlled by the focus adjusting unit 72 on the basis of the tracking table 100 stored ahead of time in the memory 40a, so that the subject distance remains substantially constant. For example, when the focus lens unit 75 is driven by the focus motor 64 on the basis of the tracking table 100, the focal state can be kept at infinity both when the move is from the wide angle end to the telephoto end, and when the move is from the telephoto end to the wide angle end.

More precisely, when the zoom ring 84 is turned, the first lens group G1 to the sixth lens group G6 move in the Z axis direction along the optical axis AZ. Consequently, the magnification of the subject image changes. At this point the focus lens unit 75 moves in the Z axis direction along the optical axis AZ in a state of being supported by the sixth lens group unit 77. When there is a relative change in the positional relationship of the first lens group G1 to the sixth lens group G6, the focal state of the subject image formed on the imaging sensor 11 also changes. That is, the subject distance at which the focal point is formed on the imaging sensor 11 changes.

In view of this, with the digital camera 1, even if the focal length changes, the subject distance can be kept substantially constant by driving the focus motor 64 according to the rotational position of the zoom ring 84. More specifically, using just the focus motor 64, the focus lens unit 75 including the fifth lens group G5 is moved with respect to the sixth lens group unit 77. The lens microcomputer 40 acquires the current rotational position of the zoom ring 84 on the basis of the detection signal of the linear position sensor 87. At the same time, the lens microcomputer 40 calculates the position of the focus lens unit 75 with respect to the sixth lens group unit 77 from the count value at the counter 40b. Utilizing the plurality of tracking tables 100 shown in FIG. 12, the lens microcomputer 40 finds the current subject distance from these two pieces of information (the current rotational position of the zoom ring 84, and the position of the focus lens unit 75 with respect to the sixth lens group unit 77), and selects the tracking table 100 corresponding to the subject distance thus found. Here, we will assume that the tracking table 100 corresponding to infinity was selected.

Next, the lens microcomputer 40 again acquires the rotational position of the zoom ring 84, and finds the rotational speed of the zoom ring 84, that is, the rate of change in the focal length, from the amount of change in the rotational position of the zoom ring 84.

Next, the lens microcomputer 40 predicts the rotational position of the zoom ring 84 after the elapse of a specific time from the current rotational angle of the zoom ring 84 and the rotational speed of the zoom ring 84, and finds as a target position the position of the focus lens unit 75 in the Z axis direction corresponding to the predicted rotational position of the zoom ring 84. After the elapse of a specific time, the lens microcomputer 40 drives the focus motor 64 via the focus drive controller 41 so that the focus lens unit 75 will be located at this target position. Consequently, the focus lens unit 75 is driven so as to follow the movement of the other lens groups, and the subject distance is kept constant.

Thus, in the electronic tracking operation, the lens microcomputer 40 predicts the change in the focal length that will accompany zooming operation, and acquires from the tracking table 100 the target position of the focus lens unit 75 corresponding to the predicted focal length. The focus lens unit 75 is driven to the target position by the focus motor 64 in parallel with the zooming operation of the optical system L. Since this operation is executed at specific time intervals, even if the zoom ring 84 is rotated and the focal length of the optical system L changes, the focus lens unit 75 will move to the Z axis direction position corresponding to the focal length on the basis of the tracking table 100, and the drive of the focus lens unit 75 can conform to the change in the focal length. Consequently, the subject distance can be kept substantially constant regardless of any change in the focal length. The control of these components may be performed by the body microcomputer 10, rather than lens microcomputer 40.

Similarly, when the focused subject distance is short, such as 1 m, for example, the tracking table 100 for which the subject distance is 1 m is selected, and both when the move is from the wide angle end to the telephoto end, and when the move is from the telephoto end to the wide angle end, the focused state at a short distance can be maintained by driving the focus motor 64, and the zooming operation can be carried out smoothly.

In particular, since the focus lens unit 75 and the focus motor 64 move in the Z axis direction integrally with the sixth lens group unit 77, even if the user turns the zoom ring 84 quickly, the focus lens unit 75 can still be moved integrally with the sixth lens group unit 77. Therefore, if the subject distance is to be kept substantially constant before and after the zooming operation, the focus motor 64 may move the fifth lens group G5 by a distance obtained by subtracting the distance that the sixth lens group G6 is moved by the cam mechanism with respect to the imaging sensor 11 from the distance that the fifth lens group G5 is to be moved with respect to the imaging sensor 11. This makes it easy to keep up with fast operation of the zoom ring 84 by the user.

Also, in this embodiment, if a zooming operation is performed from the wide angle end to the telephoto end, with the subject distance at infinity, the focus lens unit 75 (more precisely, the fifth lens group G5, which is a focus lens group) must be moved in the Z axis direction by about 3 mm with respect to the imaging sensor 11. When the focus motor 64 is driven at 3000 pps, the amount of drive of the focus lens unit 75 per rotation of the focus motor 64 is 0.3 mm as mentioned above, so it takes 0.4 second to move the focus lens unit 75 by 10 mm in the Z axis direction on the basis of the tracking table. Since it is possible to move the focus lens unit 75 from the wide angle end to the telephoto end in approximately 0.4 second, even if the user should turn the zoom ring 84 from the wide angle end to the telephoto end in 0.5 second, the drive of the focus lens unit 75 can keep up with the change in focal length. Consequently, even if the user should perform a quick zooming operation while looking at the subject on the display unit 20 in live view mode, for example, the subject image that shows on the display unit 20 will be unlikely to be blurred, and this makes the camera easier to use.

(3) Focusing Operation

Next, the focusing operation of the digital camera 1 will be described. The digital camera 1 has two focus modes: an auto-focus imaging mode and a manual imaging mode. The user of the digital camera 1 can select the focus mode with a focus imaging mode setting button (not shown) provided to the camera body 3.

In the auto-focus imaging mode, auto-focus operation is performed by contrast detection method. When auto-focusing is performed by contrast detection method, the body microcomputer 10 asks the lens microcomputer 40 for contrast AF data. This contrast AF data is necessary in auto-focusing by contrast detection method, and includes, for example, the focus drive speed, focus shift amount, image magnification ratio, and information about whether contrast AF is possible.

The body microcomputer 10 monitors whether or not the shutter button 30 has been pressed half way down. If the shutter button 30 has been pressed half way down, the body microcomputer 10 issues an auto-focus commencement command to the lens microcomputer 40. This auto-focus commencement command is to start the auto-focus operation by contrast detection method. Upon receiving this command, the lens microcomputer 40 drives and controls the focus motor 64, which is a focus actuator. More precisely, the lens microcomputer 40 sends a control signal to the focus drive controller 41. On the basis of this control signal, the focus drive controller 41 drives the focus motor 64, and the focus lens unit 75 moves minutely.

The body microcomputer 10 calculates an evaluation value for auto-focus operation (hereinafter referred to as an AF evaluation value) on the basis of the received image data. More specifically, the body microcomputer 10 sends a command to the digital signal processor 15. The digital signal processor 15 sends an image signal to the body microcomputer 10 at a specific timing on the basis of the received command. The body microcomputer 10 finds a brightness signal from the image data produced by the imaging sensor 11, and finds the AF evaluation value by integrating the high-frequency component within the screen of the brightness signal. The AF evaluation value thus calculated is stored in a DRAM (not shown) in a state of being associated with the exposure synchronization signal. Since the lens position information acquired by the body microcomputer 10 from the lens microcomputer 40 is also associated with the exposure synchronization signal, the body microcomputer 10 can store the AF evaluation value with it associated with the lens position information.

Next, the body microcomputer 10 extracts as the focal point the position of the focus lens unit 75 where the AF evaluation value is at its maximum, on the basis of the AF evaluation value stored in the DRAM. The method for driving the focus lens unit 75 in the extraction of the focal point is generally known as a hill climbing method. With a hill climbing method, the focus lens unit 75 is moved in the direction of increasing the AF evaluation value, and the AF evaluation value is found for each position of the focus lens unit 75. This operation is continued until the maximum value for the AF evaluation value is detected, that is, until the AF evaluation value increases up to its peak and begins to decrease.

The body microcomputer 10 sends a control signal to the focus drive controller 41 via the lens microcomputer 40 so that the focus lens unit 75 will be driven to the position corresponding to the extracted focal point. The focus drive controller 41 produces a drive pulse for driving the focus motor 64 on the basis of a control signal from the body microcomputer 10 (or the lens microcomputer 40), for example. The focus motor 64 is driven by an amount corresponding to this drive signal, and the focus lens unit 75 moves in the Z axis direction to the position corresponding to the focal point.

Focusing in auto-focus imaging mode is performed in this way with the digital camera 1. The above operation is executed instantly when the user presses the shutter button 30 half way down.

Focusing by contrast detection method can also be carried out in monitor imaging mode (known as viewfinder mode), in which real-time image data can be produced with the imaging sensor 11. The reason for this is that in viewfinder mode, image data is produced in a steady state by the imaging sensor 11, and auto-focusing by contrast detection method using this image data is easy.

In viewfinder mode, since a real-time image of the subject is displayed on the display unit 20, the user can decide on the composition for taking the still picture or moving picture while looking at the display unit 20. Also, there is another imaging mode the user can select in addition to live view mode using the display unit 20, which is a second live view mode (viewfinder imaging mode) in which the subject image from the interchangeable lens unit 2 is guided to the liquid crystal viewfinder 8 (viewfinder unit 38).

The manual focus imaging mode will now be described.

When the user turns the focus ring 89, the focus ring angle detector 90 detects the rotational angle of the focus ring 89 and outputs a signal corresponding to this rotational angle. The focus drive controller 41 is able to receive signals from the focus ring angle detector 90, and able to send signals to the focus motor 64. The focus drive controller 41 sends the decision result to the lens microcomputer 40. The focus drive controller 41 drives the focus motor 64 on the basis of a control signal from the lens microcomputer 40. More precisely, the lens microcomputer 40 produces a drive signal for driving the focus motor 64 on the basis of a focus ring rotational angle signal. When the lead screw 64a of the focus motor 64 rotates according to the drive signal, the focus lens unit 75 moves in the Z axis direction via the rack 66 that meshes with the lead screw 64a. In the wide angle end state shown in FIGS. 5 and 6, the subject distance is infinity, but as the subject distance draws closer, the focus lens unit 75 moves to the Z axis direction negative side. Similarly, in the telephoto end state shown in FIGS. 7 and 8, the subject distance is infinity, but as the subject distance becomes shorter, the focus lens unit 75 moves to the Z axis direction negative side. The amount of movement of the focus lens unit 75 is greater in this case than in the case of the wide angle end.

In this way, the user can perform focusing by turning the focus ring 89 while looking at the subject on the display unit 20. In the manual focus imaging mode, when the user presses the shutter button 30 all the way down, imaging is performed in this unchanged state.

(4) Still Picture Capture

When the user presses the shutter button 30 all the way down, a command is sent from the body microcomputer 10 to the lens microcomputer 40 so that the aperture value of the optical system L will be set to the aperture value calculated on the basis of the light measurement output of the imaging sensor 11. The aperture drive controller 42 is controlled by the lens microcomputer 40, and the aperture unit 62 is constricted to the indicated aperture value. Simultaneously with the indication of the aperture value, a drive command is sent from the imaging sensor drive controller 12 to the imaging sensor 11, and a shutter unit 33 drive command is sent out. The imaging sensor 11 is exposed by the shutter unit 33 for a length of time corresponding to the shutter speed calculated on the basis of the light measurement output of the imaging sensor 11.

The body microcomputer 10 executes imaging processing and, when the imaging is completed, sends a command signal to the image recording controller 19. The image recorder 18 records an image signal to an internal memory and/or removable memory on the basis of the command of the image recording controller 19. The image recorder 18 records imaging mode information (whether auto-focus imaging mode or manual focus imaging mode) along with the image signal to the internal memory and/or removable memory on the basis of the command of the image recording controller 19.

Upon completion of the exposure, the imaging sensor drive controller 12 reads image data from the imaging sensor 11, and after specific image processing, image data is outputted via the body microcomputer 10 to the image display controller 21. Consequently, the captured image is displayed on the display unit 20.

Also, upon completion of the exposure, the shutter unit 33 is reset to its initial position by the body microcomputer 10. The body microcomputer 10 issues a command to the lens microcomputer 40 for the aperture drive controller 42 to reset the aperture unit 62 to its open position, and a reset command is sent from the lens microcomputer 40 to the various units. Upon completion of this resetting, the lens microcomputer 40 tells the body microcomputer 10 that resetting is complete. After the resetting completion information has been received from the lens microcomputer 40, and after a series of post-exposure processing has been completed, the body microcomputer 10 confirms that the shutter button 30 is not being pressed, and the imaging sequence is concluded.

(5) Moving Picture Capture

The digital camera 1 also has the function of capturing moving pictures. In moving picture imaging mode, image data is produced by the imaging sensor 11 at a specific period, and the image data thus produced is utilized to continuously carry out auto-focusing by contrast detection method. In moving picture imaging mode, if the shutter button 30 is pressed, or if the moving picture capture operation button 24 is pressed, a moving picture is recorded to the image recorder 18, and when the shutter button 30 or the moving picture capture operation button 24 is pressed again, recording of the moving picture by the image recorder 18 is stopped.

Features Related to Optical System Layout

The layout of the optical system of the digital camera 1 described above are as follows.

(1)

With this digital camera 1, since the focus lens unit 75 moves in the Z axis direction (a direction parallel to the optical axis AZ) along with the sixth lens group unit 77, the focus lens unit 75 can be moved with respect to the imaging sensor 11 by the amount of movement of the sixth lens group unit 77 with respect to the imaging sensor 11. Consequently, a large amount of drive of the focus lens unit 75 can be ensured even though there is not much space in front of and behind the focus lens unit 75. That is, the interchangeable lens unit 2 can be more compact.

Furthermore, since the sixth lens group unit 77 is disposed nearest to the image plane out of the optical system L, the sixth lens group G6 and the fifth lens group G5 can be more compact than when the sixth lens group unit 77 is not disposed nearest to the image plane. Using a smaller fifth lens group G5 allows the drive speed of the focus lens unit 75 to be raised and affords faster auto-focusing.

Thus, with this interchangeable lens unit 2, both faster auto-focusing and a smaller size can be achieved.

(2)

Since the sixth lens group unit 77 is disposed nearest to the image plane out of the optical system, the focus lens unit 75 is disposed on the object side of the sixth lens group unit 77. Accordingly, the user will not touch the focus lens unit 75 in a state in which the lens barrel has been removed, for example. This prevents the focus lens unit 75 from being improperly attached due to the touching of the focus lens unit 75 by the user.

Also, with this lens barrel, since there is no need to mount a protective glass piece (for protecting the lens) on the imaging sensor 11 side, reflection of light by the protective glass can be prevented, which prevents ghosting and flare.

(3)

As shown in FIGS. 7 and 8, the fourth lens group unit 78 is able to move in the optical axis direction within the first movement range F4 using the imaging sensor 11 as a reference, and the focus lens unit 75 is able to move in the optical axis direction within the second movement range F5 using the imaging sensor 11 as a reference. Since the second movement range F5 overlaps the first movement range F4, the size of the optical system L in the Z axis direction can be reduced, which allows the interchangeable lens unit 2 to be more compact.

(4)

As shown in FIGS. 5 and 7, since the drive shaft 64a protrudes to the subject side (the Z axis direction positive side) from the motor body 64s, this prevents the stepping motor 64d, which is larger than the drive shaft 64a, from interfering with the fourth lens group unit 78. Consequently, the focus motor 64 and the fourth lens group unit 78 can be disposed closer together, which allows the interchangeable lens unit 2 to be even more compact.

(5)

Since the stepping motor 64d is disposed to the outside of the sixth lens group G6 in the radial direction, this reduces how much the stepping motor 64d sticks out from the sixth lens group unit 77 in the Z axis direction. Consequently, the interchangeable lens unit 2 can be made even more compact.

Features Related to Lens Mount

Features related to the lens mount 95 of the digital camera 1 are as follows.

(1)

With this digital camera 1, when viewed in the Z axis direction, the lens mount contact 91 is disposed on the opposite side from the focus motor 64 with respect to the sixth lens group G6. More specifically, as shown in FIGS. 13 and 14, if we let the line that passes through the center of the lens mount contact 91 and is perpendicular to the optical axis AZ of the sixth lens group G6 be a first imaginary line P, the focus motor 64 is disposed on the opposite side from the lens mount contact 91 (within the range M) with respect to a second imaginary line M1 that is perpendicular to the first imaginary line P and the optical axis AZ. Consequently, the focus motor 64 can be disposed at a position that is away from the lens mount contact 91, the encoder 64e of the focus motor 64 will be less affected by noise generated by the lens mount contact 91, and there will be less of a decrease in the detection accuracy of the encoder 64e.

(2)

The focus motor 64 is disposed at a position that is symmetrical with the lens mount contact 91 using the optical axis AZ of the sixth lens group G6 as a reference. More specifically, as shown in FIGS. 13 and 14, when viewed in the Z axis direction, the focus motor 64 is disposed within the range N between the third imaginary line N1 and the fourth imaginary line N2. Therefore, the focus motor 64 can be disposed at a position that is safely away from the lens mount contact 91, so the encoder 64e of the focus motor 64 will be less affected by noise generated by the lens mount contact 91.

(3)

When viewed in the Z axis direction, the focus motor 64 overlaps the first imaginary line, so the focus motor 64 can be safely disposed at a position that is away from the lens mount contact 91, and the encoder 64e of the focus motor 64 will be less affected by noise generated by the lens mount contact 91.

(4)

Since the electrical substrate 94 is cut out in a portion corresponding to the focus motor 64, even though the electrical substrate 94 is disposed within the range of movement of the focus motor 64, the focus motor 64 will not come into contact with the electrical substrate 94. This means that the interchangeable lens unit 2 can be more compact. This effect is obtained by substituting another actuator for the focus motor 64. For example, the focus motor 64 need not have the encoder 64e.

(5)

Since the connector 96a is disposed on the opposite side of the focus motor 64 with respect to the lens mount contact 91, the focus motor 64 can be disposed at a position that is away from the connector 96a. The connector 96a is similar to the lens mount contact 91 in that it can be a source of noise. Therefore, the focus motor 64 will be less affected by noise generated by the connector 96a, and there will be less of a decrease in the detection accuracy of the encoder 64e.

Features Related to Electronic Tracking

Features related to electronic tracking with the digital camera 1 are as follows.

(1)

As shown in FIG. 12, with this digital camera 1, the tracking table 100 does not have an inflection point between the wide angle end and the telephoto end. That is, the focus lens unit 75 is driven in one direction with respect to the sixth lens group unit 77 when the sixth lens group unit 77 is being driven by the zoom ring unit 83 in that direction with respect to the fourth lens group unit 78. Accordingly, the direction of movement of the focus lens unit 75 with respect to the sixth lens group unit 77 does not change while the sixth lens group unit 77 is being driven in one direction by the zoom ring unit 83. Consequently, there is no decrease in the drive speed of the focus lens unit 75 midway, and the drive speed of the focus lens unit 75 can be raised. That is, control of the focus motor 64 can keep up with fast operation of the zoom ring unit 83.

(2)

With the infinity tracking table 100, since the starting point position D is disposed in the center between the first position E1 of the focus lens unit 75 corresponding to the wide angle end and the second position E2 of the focus lens unit 75 corresponding to the telephoto end, when the focus lens unit 75 is driven using the starting point position D as a reference, the focus lens unit 75 can be moved relatively quickly to the various positions. This allows the state of the digital camera 1 to be changed smoothly to a state in which imaging is possible.

In particular, since there is a higher probability of capturing the subject at the infinity position when the user turns on the power to the digital camera 1 to photograph the subject, the starting point position D is disposed in the center of the infinity tracking table 100, which allows the state of the digital camera 1 to be changed smoothly to a state in which imaging is possible.

Other Embodiments

Embodiments are not limited to those discussed above, and various changes and modifications are possible without departing from the gist of the present invention. Also, the above embodiments are basically just favorable examples, and are not intended to limit the present invention, its applications, or the scope of these applications.

(1)

In the above embodiments, the digital camera was capable of capturing both moving and still pictures, but may instead be capable of capturing just still pictures, or just moving pictures.

(2)

The digital camera 1 may be, for example, a digital still camera, a digital video camera, a mobile telephone equipped with a camera, or a PDA equipped with a camera.

(3)

The above-mentioned digital camera 1 did not have a quick return mirror, but may have a quick return mirror as do conventional single lens reflex cameras.

(4)

The configuration of the optical system L is not limited to that in the embodiments. For example, the first lens group G1 to the sixth lens group G6 may each made up of a plurality of lenses.

Also, in the above embodiment, the sixth lens group unit 77 was disposed nearest to the image plane out of the optical system L, but the focus lens unit 75, rather than the sixth lens group unit 77, may instead be disposed nearest to the image plane out of the optical system L. Here again, the fifth lens group G5 can be made more compact, and faster auto-focusing and a smaller size can both be achieved.

(5)

In the above embodiment, the exposure time to the imaging sensor 11 was controlled by operating the shutter unit 33, but the exposure time of the imaging sensor 11 may instead be controlled by an electronic shutter.

(6)

In the above embodiment, electronic tracking was performed by the lens microcomputer 40, but a command may be sent from the body microcomputer 10 to the lens microcomputer 40, and the control of the electronic tracking performed on the basis of this command.

(7)

With the tracking table 100, the starting point position D is disposed in the center between the first position E1 of the focus lens unit 75 corresponding to the wide angle end and the second position E2 of the focus lens unit 75 corresponding to the telephoto end. However, as long as the state of the digital camera 1 to be changed smoothly to a state in which imaging is possible, the starting point position D may be shifted somewhat from the center between the first position E1 and the second position E2. In other words, the starting point position D should be in the approximate center between the first position E1 and the second position E2.

(8)

The focus motor 64 is an example of an actuator. The actuator here is a concept that encompasses a stepping motor, an electromagnetic motor, a vibrating actuator that has a piezoelectric element, and so forth.

What is claimed is:
1. A lens barrel that can be mounted to a camera body, comprising:
   a lens element;
   a lens support frame supporting the lens element;
   an actuator fixed to the lens support frame and including a drive shaft and a detector configured to detect rotation of the drive shaft; and
   an electrical contact disposed on the opposite side from the actuator with respect to the lens element when viewed in the optical axis direction parallel to the optical axis of the lens element, and configured to be electrically connected with the camera body.
2. The lens barrel according to claim 1, wherein,
   when a first imaginary line is a line passing through the center of the electrical contact and perpendicular to the optical axis center line of the lens element, the actuator is disposed on the opposite side from the electrical contact with respect to a second imaginary line perpendicular to the first imaginary line and the optical axis center line.

3. The lens barrel according to claim 2, wherein the actuator is disposed at a position that is in point symmetry with some portion of the electrical contact, using the optical axis center line of the lens element as a reference.

4. The lens barrel according to claim 2, wherein,
when viewed in the optical axis direction, the actuator overlaps the first imaginary line.

5. The lens barrel according to claim 3, wherein
the actuator overlaps the first imaginary line when viewed in the optical axis direction.

6. An imaging device, comprising:
the lens barrel according to claim 1; and
a camera body to which the lens barrel can be mounted.

* * * * *